United States Patent [19]

Funabashi

[11] Patent Number: 4,561,085
[45] Date of Patent: Dec. 24, 1985

[54] FRONT LOADING DISC PLAYER

[75] Inventor: Tadashi Funabashi, Tokorozawa, Japan

[73] Assignee: Pioneer Electronic Corporation, Tokyo, Japan

[21] Appl. No.: 655,645

[22] Filed: Sep. 28, 1984

[30] Foreign Application Priority Data

Sep. 30, 1983 [JP] Japan .................. 58-152503[U]

[51] Int. Cl.4 .................. G11B 1/00; G11B 3/08; G11B 17/04
[52] U.S. Cl. .................. 369/77.1; 369/75.2
[58] Field of Search .................. 369/75.2, 77.1

[56] References Cited

U.S. PATENT DOCUMENTS 4,272,794 6/1981 Sharky .................. 369/75.2
4,337,533 6/1982 Ando et al. .................. 369/77.1
4,410,971 10/1983 Eisemann .................. 369/75.2

FOREIGN PATENT DOCUMENTS 161187 9/1983 Japan .................. 369/75.2
2075242 11/1981 United Kingdom .................. 369/75.2

Primary Examiner—Steven L. Stephan
Attorney, Agent, or Firm—Schwartz, Jeffery, Schwaab, Mack, Blumenthal & Evans

[57] ABSTRACT

A front-loading disc player comprises a housing and an electrically driven disc transport mechanism operable to transport a disc from a position external to the housing to a position within the housing above a playing mechanism and to mount the disc on the playing mechanism. The disc transport mechanism is based upon a tray which is slidably mounted in the housing, a container which supports the disc until it is mounted on the playing mechanism, and a cam mechanism slidably mounted on the tray and supports the container, and which is driven through a rack gear to produce all of the requisite movements of the tray and container.

15 Claims, 31 Drawing Figures

FRONT LOADING DISC PLAYER

BACKGROUND OF THE INVENTION

The present invention relates to a front-loading disc player for playing what are generally referred to as "compact discs", usually having music recorded thereon, and is particularly directed towards a front-loading disc player in which the disc contents are read out by photo-electric means, i.e. employing a laser light beam.

Hitherto, players for such compact discs have been generally of top-loading configuration, in which the user must insert the disc to be played through an aperture on an upper face of the player, onto the playing mechanism. Such an arrangement has the advantage of simplicity and hence low manufacturing cost. However there is a requirement for such a compact disc player to be front-loading type, i.e. with discs being inserted into the player through a front-panel aperture, since this permits other equipment to be placed upon the upper surface of the disc player. It is an objective of the present invention to provide a new configuration for such a front-loading disc player, having the advantages of basic mechanical simplicity and minimum number of components, in order to provide low manufacturing cost and high reliability.

SUMMARY OF THE INVENTION

To meet the objectives outlined above, a front-loading disc player according to the present invention basically comprises a housing having a substantially vertically oriented front panel with an aperture formed therein, and an electrically driven disc transport mechanism for transporting a disc to be played, from a loading position, external to the housing, to a playing position within the housing at which the disc is automatically mounted upon the playing means to be rotated thereby and have the contents thereof read out by suitable read-out means disposed within the housing. The disc transport mechanism essentially comprises a member, referred to in the following as a tray, which is slidably mounted for movement along a predetermined substantially horizontal direction inward and outward through the front panel aperture, and a supporting member which will be referred to as a container and which is positioned below the tray aperture to support the disc at all times other than when the disc is mounted on the playing mechanism. The disc transport mechanism moreover comprises a pair of elongated cam members which are slidably mounted on the tray and are provided with suitably inclined cam apertures in which the container is supported by protruding portions thereof, the container being restrained against movement in any direction other than substantially vertically with respect to the tray, and further comprises a linking mechanism which mutually couples the cam members such as to produce mutually opposite directions of movement thereof, substantially parallel to the above-mentioned predetermined horizontal direction. In addition, the disc transport mechanism comprises locking means for locking the linking mechanism and hence the cam members with respect to the tray at all times other than when the disc transport mechanism is at the playing position, and is released when the latter position is reached. The disc transport mechanism is driven by a motor acting through a speed reduction mechanism coupled to a rack gear portion formed along one of the cam members.

Thus, while the linking mechanism is in the locked state, the latter drive means are operable to drive the disc transport mechanism as a unit inward with respect to the housing, while when the disc transport mechanism reach the playing position, the drive means act to lower the disc onto the playing mechanism.

Unloading of a disc from the player is performed by a series of operations which are the exact inverse of those described above.

In this way, a single drive system is utilized, in conjunction with locked and unlocked operation of the cam member linking mechanism, to perform all of the drive operations required to load a disc onto the playing mechanism after the disc has been inserted into the tray from a position external to the housing, i.e. to transfer the disc to be supported by and rotated by the playing mechanism, and is also utilized to unload a disc from the player when desired.

DESCRIPTION OF THE PREFERRED EMBODIMENTS

Figure 4:
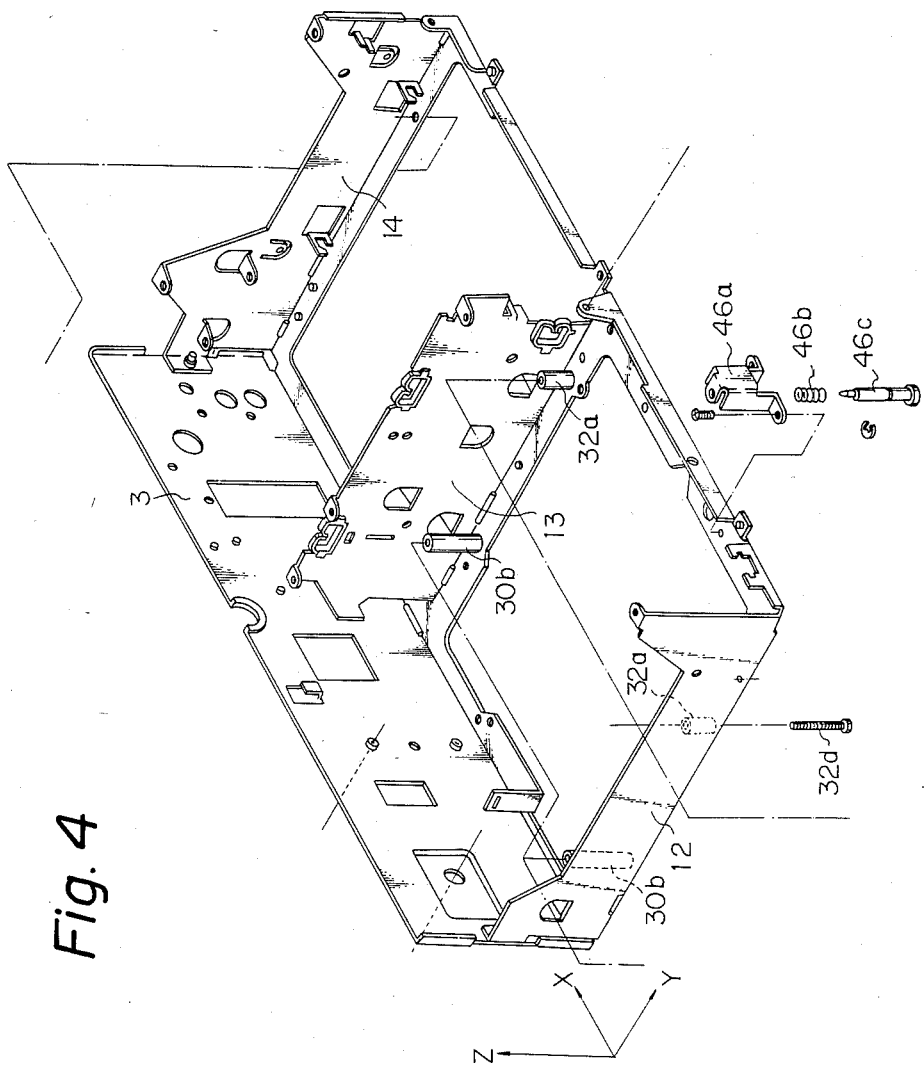
FIG. 4 is an oblique view to illustrate an arrangement of chassis within a housing of the described embodiment.

The general configuration of a front loading disc player according to the present invention will first be described, referring to FIGS. 1 and 2. The player is contained in a housing 6, made up of a vertically oriented front panel 2, a rear panel 3, a base plate 4 and a cover plate 5, mutually attached by screws. An elongated rectangular aperture 2a is formed in front panel 2, through which a disc carrier assembly (described hereinafter) can be moved to protrude outward from housing 6. A transformer 8 and a cover 19 for the transformer are mounted on the rear panel 3, together with a power supply cord 10. As shown in FIGS. 2 and 4, three vertically aligned chassis 12, 13 and 14 are fixed to rear panel 3. The front edge of each of these vertical chassis is attached to an operating section 16, which is provided with control keys and circuits, etc, for producing signals to control the operation of the disc player.

In the following, the term "frontward" or "towards the front" has the meaning of a direction as indicated by the arrow Y in the drawings, with the term "rearwards" denoting the reverse direction. The directions perpendicular to the Y direction are indicated by arrows X and Z in FIG. 1, and the X-Y plane will be generally referred to as the horizontal plane, while the direction parallel to arrow Z will be generally referred to as the vertical direction.

Figure 5:
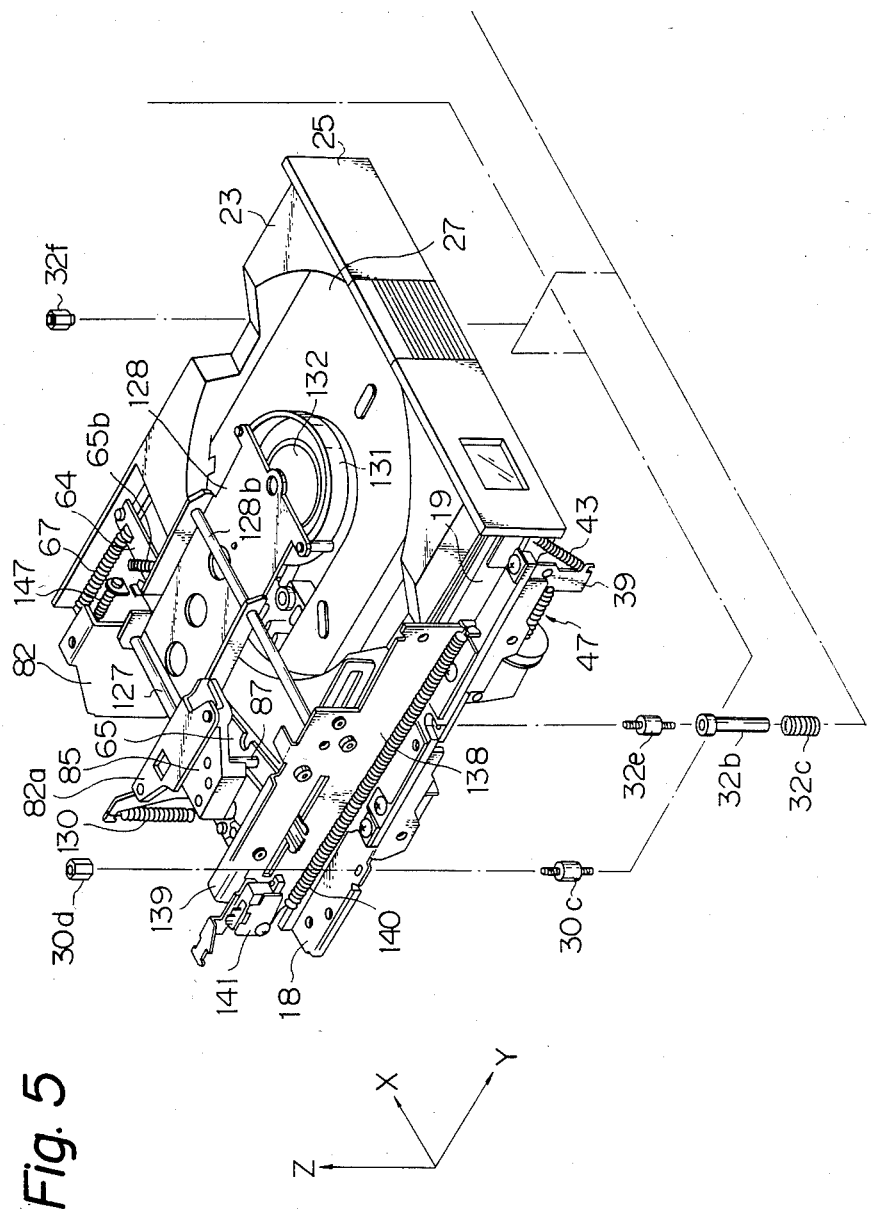
FIG. 5 is an oblique external view of an assembled disc transport mechanism and drive system in the described embodiment.
Figure 12:
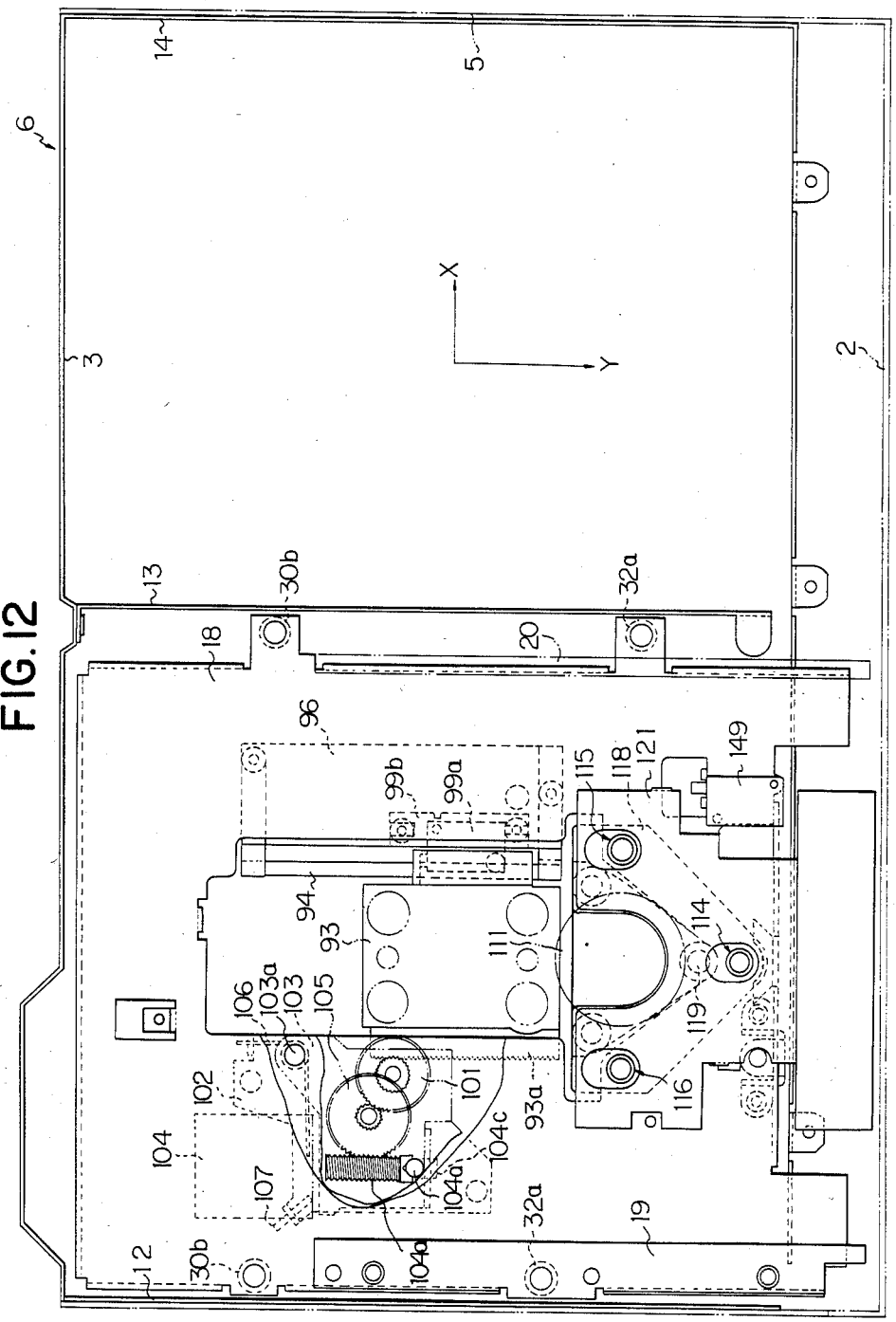
FIG. 12 is a plan view illustrating the positions of major components within the housing of the described embodiment.
Figure 13:
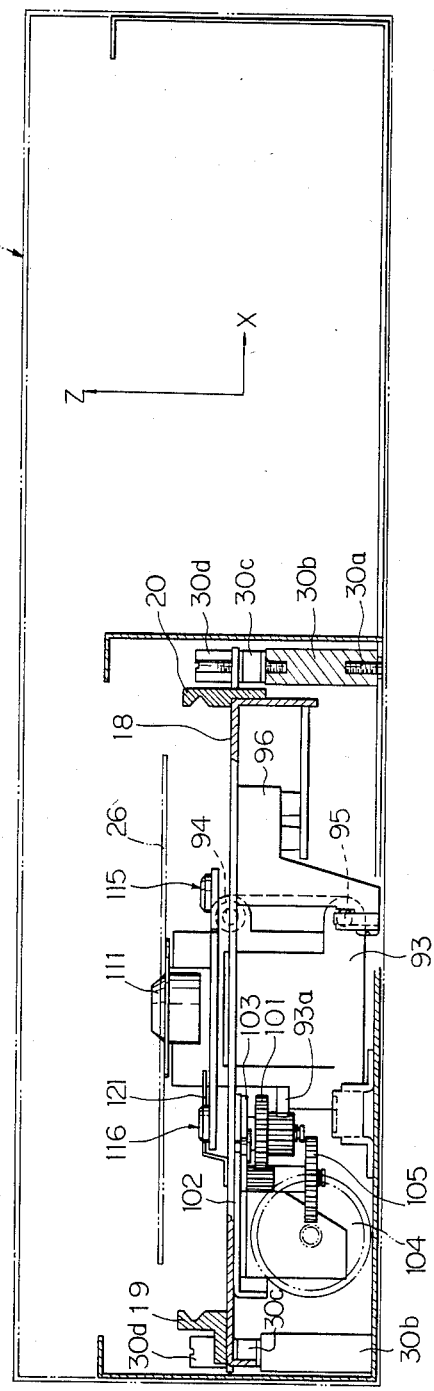
FIG. 13 is a partly cross-sectional view in elevation corresponding to FIG. 12.
Figure 14:
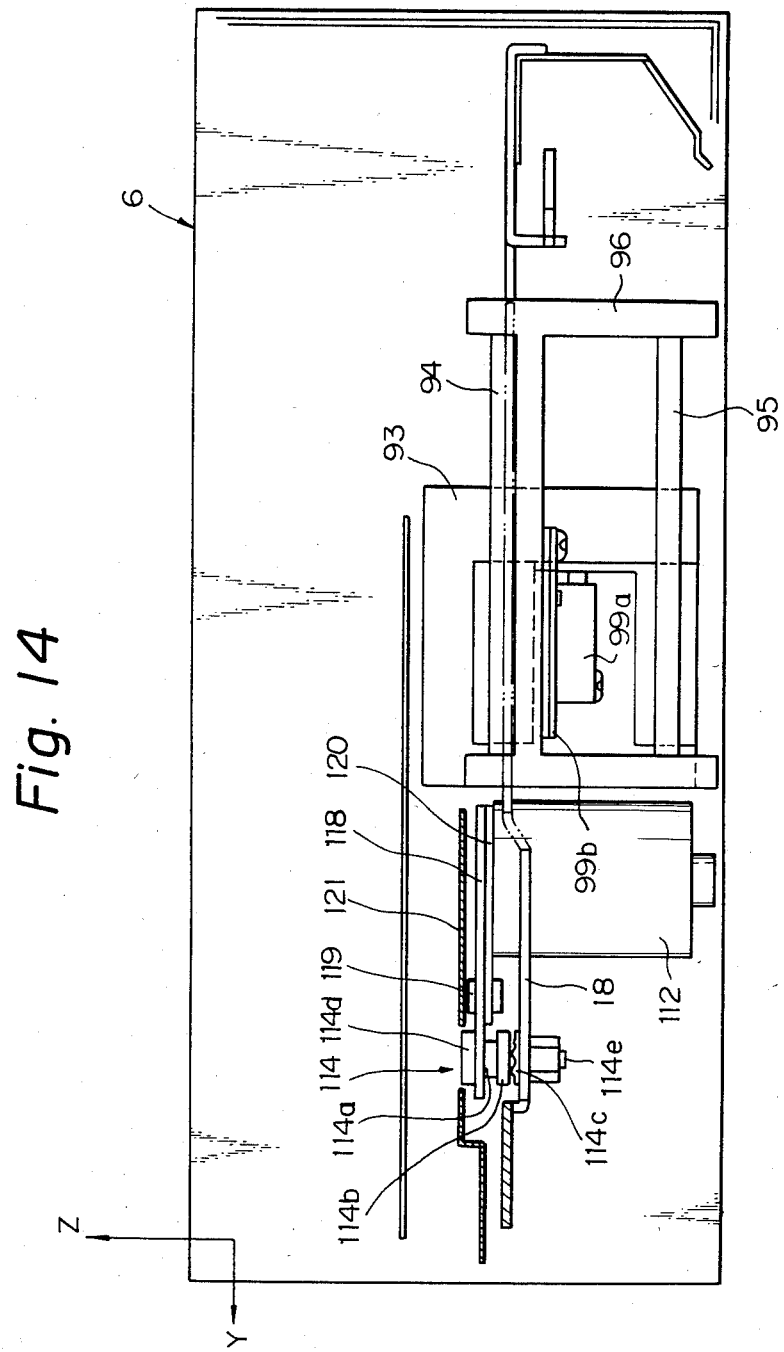
FIG. 14 is a cross-sectional view in elevation to illustrate the positional relationships between components within the housing of the described embodiment.
Figure 15:
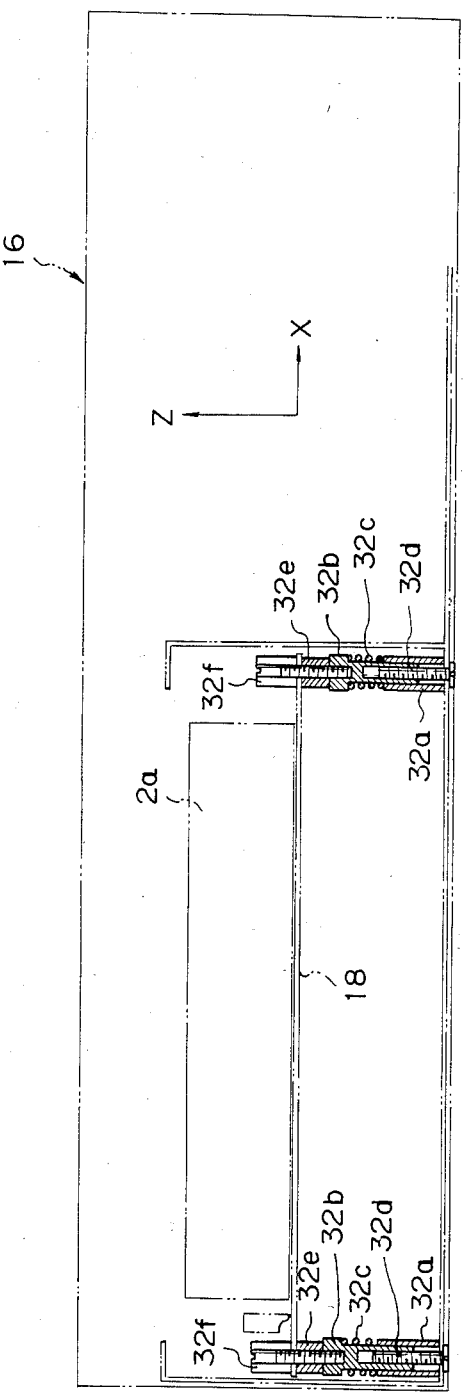
FIG. 15 is a cross-sectional view to illustrate means disposed towards the front of the player for supporting a horizontal chassis.

As shown in FIG. 2 and in FIGS. 12 and 13, horizontal chassis 18 is mounted between vertical chassis 12 and 13. As is most clearly shown in FIGS. 3, 7, 12 and 13, rails 19 and 20 are attached to horizontal chassis 18 on the left and right sides of horizontal chassis 18 (i.e. as viewed along the Y direction), extending longitudonally from front to rear. As shown in FIG. 2, and FIG. 5, a tray 23 is disposed between these rails and mounted slidably thereon by means of retaining portions 19a and 20a and 20b, which prevent tray 23 from falling from rails 19, 20 and also by means of fixed bearing members 24a and 24b and supporting plates 24c and 24d. In this way, tray 23 is made freely slidable in the frontward and rearward directions. A sub-panel 25 is mounted on the outer end of tray 23, shaped such as to fit within aperture 2a in front panel 2 when tray 23 is disposed fully inward within housing 2, to thereby completely close aperture 2a.

A container 27 is disposed within tray 23, which is restrained such as to be only movable in the upward (i.e. Z direction) and downward directions with respect to the tray, and which supports a disc which is to be played, i.e. container 27 can be pulled outward from housing 6 together with tray 23. The container 27 constitutes, in conjunction with tray 23, a disc carrier assembly.

The present embodiment of a front loading disc player according to the present invention is of the type which is played by directing a laser light beam onto the disc surface, with the disc contents being read out by sensing the resultant reflected light. Such discs are generally used for audio reproduction, and have a diameter of approximately 12 cm.

Figure 6:
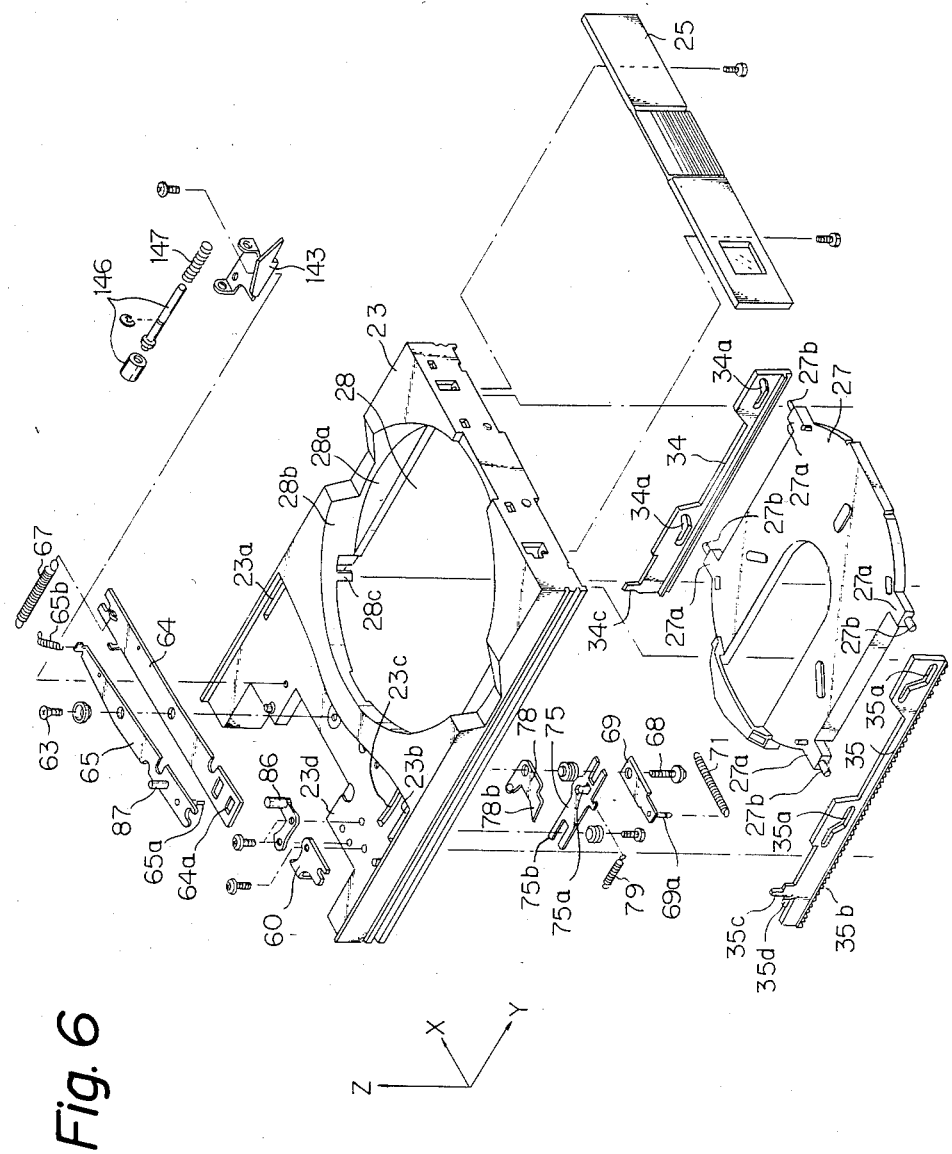
FIG. 6 is an oblique expanded view to illustrate elements of the disc transport mechanism.

As is made clear from FIG. 6, a short tubular aperture 28 is formed in tray 23, whose axis is aligned in the vertical direction, i.e. perpendicular to tray 23. Horizontally disposed mutually opposing portions 28a are formed on the left and right sides of the lower extremity of tubular aperture 28, and will be referred to as the base portions thereof. In addition, the side wall 28b of tubular aperture 28 is cut out as shown, i.e. parts of the lower part of side wall 28b at the front and rear thereof are cut out, leaving symmetrically opposing portions of side wall 28b in the uncut state. The spacing between the opposing base portions 28a is made slightly greater than the distance between the parallel side edges of container 27. In this way, container 27 within a lower portion of tubular aperture 28 with disc 26 supported on the upper face of container 27, which will be referred to in the following as the disc supporting face thereof.

Catch portions 28c are formed in the cut-out side face 28b of tubular aperture 28, extending downward as shown, there being four of these symmetrically disposed as two opposing pairs.

The disc carrier assembly comprising tray 23 and container 27 is movably supported by a supporting mechanism made up of horizontal chassis 18 and rails 19 and 20. This will be described referring to FIGS. 2, 4, 5, 12 and 13. The rear end of horizontal chassis 18 is fixedly supported by a pair of pillars 30b which are attached to vertical chassis 12 and 13 by means of screws 30a in conjunction with nuts 30d which bear against respective dampers 30c. Each of dampers 30c is formed of a resilient material such as rubber. In this way, the pair of pillars 30b, dampers 30c, screws 30a and nuts 30d constitute a supporting leg assembly whereby the rear end of horizontal chassis 18 is supported and is fixedly positioned with respect to the rear of housing 6. However it should be noted that it is possible to form this supporting leg assembly as a single unit which is an integral part of horizontal chassis 18 or housing 6. The vertical chassis 12 and 13 each have one of a pair of tubular members 32a attached thereto, with the longitudonal axis thereof being disposed in the vertical direction, and with members 32a being disposed close to aperture 2a in housing 6. Shaft members 32b are respectively slidably fitted within tubular members 32a, with the upper end of each of shaft members 32b being of expanded diameter and the lower end being of tubular shape. Coil springs 32c are respectively compressed between the expanded portions of shaft members 32b and the upper ends of tubular members 32a. Screws 32d are respectively engaged within tapped holes formed in the tubular end portions of shaft members 32b, whereby reaction forces are exerted against screws 32d by vertical chassis 12 and 13. Screws 32d can be tightened from the exterior of housing 6. The right-hand and left-hand sides of the front end of horizontal chassis 18 are fixedly attached to the upper ends of shaft members 32b by nuts 32f acting through dampers 32e respectively, the latter being formed of a resilient material such as rubber. Thus, the tubular members 32a, shaft members 32b, coil springs 32c, screws 32d, dampers 32e and nuts 32f constitute a supporting leg assembly whereby the front end of horizontal chassis 18, i.e. the front end of the disc carrier assembly, is supported and is positioned with respect to the front of housing 6. The height of the respective legs of this supporting leg assembly can be adjusted by rotation of screws 32d from outside housing 6.

Figure 3:
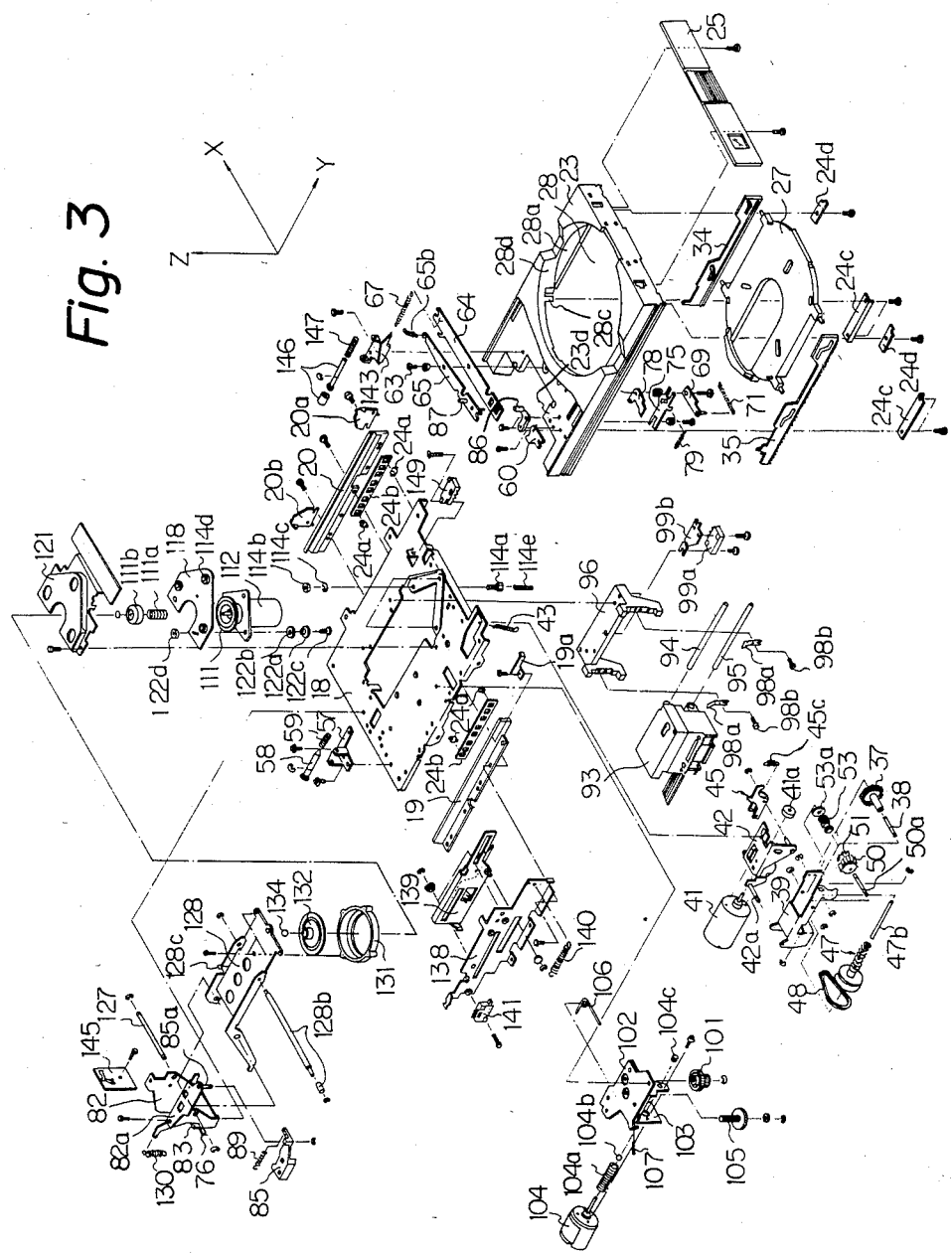

As illustrated in FIGS. 3, 6 and 12, a pair of elongated cam members 34 and 35 are slidably mounted for movement in the frontward and rearward directions on the right and left-hand interior walls of tray 23. Cam member 34 has formed therein a pair of cam apertures 34a, 34b, which slidably engage with a pair of shaft portions 27b formed on a corresponding pair of coupling protrusions 27a formed on container 27. Each of cam apertures 34a is provided with an elongated portion thereof which is inclined downward, as viewed moving from front to rear of the disc player. Each of cam apertures 35a is formed with an elongated portion which is inclined upwards, viewed moving from front to rear. Container 27 is thus supported by cam members 34 and 35 such that by relative movement of cam members 34 and 35, container 27 can be moved selectively upwards and downwards. Of the pair of cam members 34 and 35, cam member 35 is formed with a rack gear portion 35b which extends longitudonally substantially along the entire length of the lower edge thereof.

As shown in FIGS. 3, 8, 25 and 26, a retaining member 39 has a shaft 38 rotatably mounted thereon. This shaft carries a gear wheel 37 which engages with rack gear portion 35b in cam member 35. The retaining member 39 is disposed at the right-hand side of the lower face of the front end of horizontal chassis 18 and is supported (restrained by a spring described hereinafter) such as to be capable of swinging vertically about a shaft 42a attached to a bracket 42, which is fixedly attached to the underside of horizontal chassis 18 and which also supports a motor 41. This motor serves as a source of drive power for moving the disc carrier assembly as a whole and for moving the cam members 34 and 35 relative to one another, as described hereinafter. The opposite end of retaining member 39 to that supported by shaft 42a is supported by a coil spring 43, (seen in FIG. 5) which urges that end of retaining member 39 upwards towards horizontal chassis 18. A lever 45 is rotatably supported on a shaft 42b on bracket 42, with a curved portion 45a of this lever 45 engaging with the upper face of a coupling portion 39a formed on retaining member 39. A bias force is applied to lever 45 by means of a coil spring 45c. If an upwardly directed force is applied to end 45b of lever 45, then retaining member 39 will be swung downward, thereby disengaging gear wheel 37 from rack gear portion 35b of cam member 35.

Figure 30:
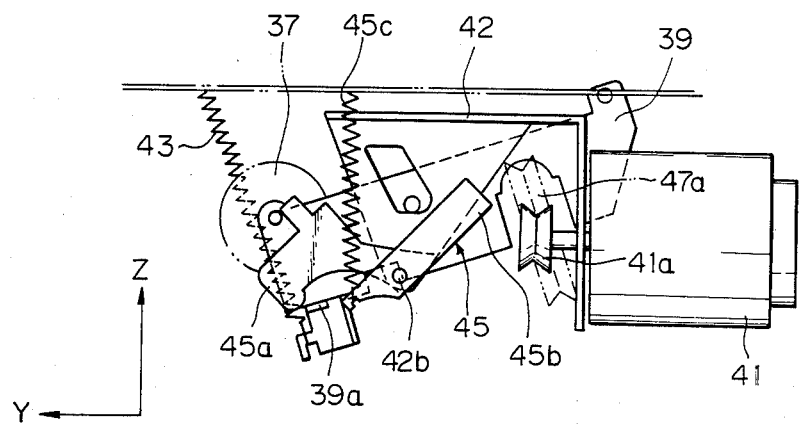
FIG. 30 is a partial view in elevation to further describe the drive system for the disc transport mechanism.

A screw 46c (shown in FIG. 4) is mounted in a bracket 46a fixed to the front edge of vertical chassis 12, which engages in end portion 45b of lever 45 and can be adjusted in conjunction with a spring 46b to apply a bias force thereto. That is to say, by tightening or loosening screw 46c from outside housing 6, a force can be applied through lever 45 whereby retaining member 39 can be swung upward to permit gear wheel 37 to engage with rack gear portion 35d or can be swung downward to disengage gear wheel 37 from rack gear portion 35d, as required. The latter condition of disengagement is preferably established for protection of the mechanism during transportation or storage in high environmental temperatures. The relationships described above may be more clearly understood by reference to FIG. 30.

Figure 27A:
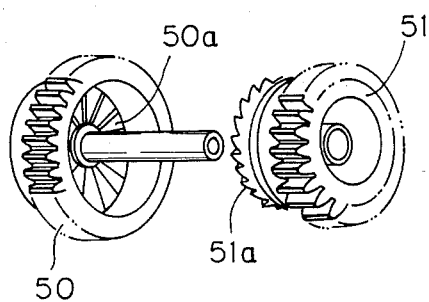
FIGS. 27(a) and 27(b) are views illustrating details of the construction of a unidirectional clutch mechanism used in the drive system for driving the disc transport mechanism.
Figure 27B:
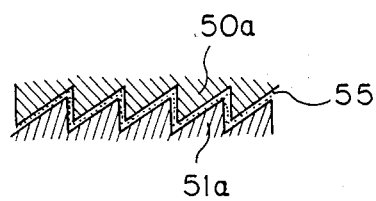
Figure 28:
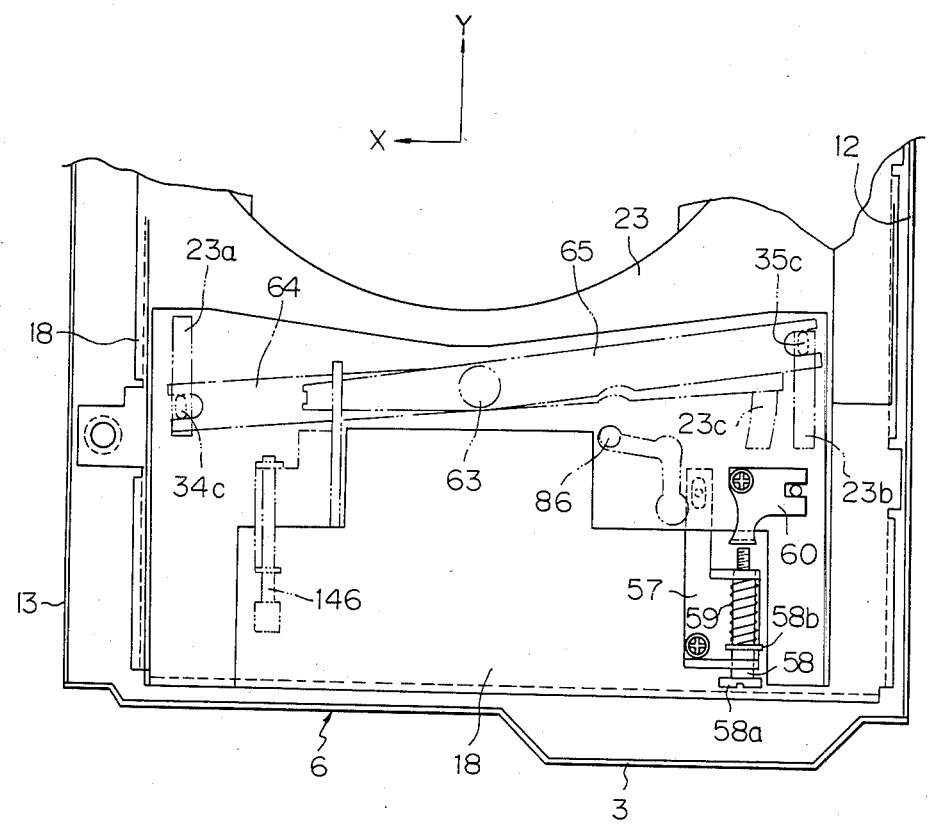
FIG. 28 is a partial view in play to illustrate tray attachment means for use during transportation.

The retaining member 39 rotatably supports a pulley 47a at one end thereof, upon a shaft 47b, with a worm 47 being mounted on shaft 47b to rotate with pulley 47a. Pulley 47a is coupled to the output of motor 41 by a small pulley 41a fixedly attached to the shaft of motor 41 and by a belt 48. Retaining member 49 also supports a worm wheel 50 upon a shaft 50a, with worm wheel 50 meshing with worm 47. A gear wheel 51 is engaged with worm wheel 50, and rotatably mounted on shaft 50 concentric with worm wheel 50. As shown in FIGS. 27(a) and 27(b), worm wheel 50 and gear wheel 51 are formed with mutually opposing faces thereof each of which has a sawtooth coupling portion (50a and 51a) formed thereon. The engagement between these is such as to ensure that rotation can only be transmitted in one direction, i.e. force can only be transmitted to gear wheel 51 by rotation of worm wheel 50 in one direction, while forcible rotation of gear wheel 51 in the latter direction will not result in application of force to worm wheel 50. Specifically, if the user should erroneously push on panel portin 25, to force tray 23 inward, then slipping will occur between gear wheels 50 and 51, which will prevent damage to the mechanism. The gear wheel 50 and worm wheel 51 are urged together by a coil spring 53, and a bearing member 53a is disposed between a side face of retaining member 39 and coil spring 53.

It can thus be understood that a unidirectional clutch mechanism is formed by worm wheel 50, gear wheel 51 and coil spring 53. As shown in FIG. 27(b), a layer of a relatively adherent viscous substance such as grease is disposed between the mutually opposing sawtooth face portions 50a and 51a of worm wheel 50 and gear wheel 51, which serves to reduce audible noise generation when the unidirectional clutch mechanism is rotating.

A speed reduction mechanism is formed by small pulley 41a, worm 47, belt 48, pulley 47a, worm 47, the unidirection clutch mechanism described above, and gear wheel 37. This speed reduction mechanism, in conjunction with motor 41, constitutes drive means for driving cam member 35 back and forth. It should be noted that the configuration of the unidirectional clutch mechanism is not limited to that described above, and various other combinations of gear wheels are possible. However it is preferable to include a worm and worm wheel in that mechanism.

The coil spring 53 which urges worm wheel 50 and gear wheel 51 together also serves as friction application means, for applying friction which acts in opposition to the direction of rotation of worm wheel 50. As a result of this friction application, backlash between worm 47 and worm wheel 50 is substantially eliminated.

When retaining member 39 is swung downward below horizontal chassis 18 as described above, e.g. for transportation of the player, then the engagement between rack gear portion 35b of cam member 35 and gear wheel 37 will be released. If the unit is then tilted, tray 23 may drop out of housing 6. To prevent this, attachment means are provided which can be operated from outside housing 6, for attaching tray 23 with respect to housing 6, within the housing. As shown in FIGS. 3, 6, 7 and 28, the attachment means comprise a bracket 57 which is fixed to the upper rear edge of horizontal chassis 18, a shaft 58 which is rotatably mounted in bracket 57 and has a screw threaded portion formed at the front end thereof, a retaining member 58b which is coupled to shaft 58 and which acts in conjunction with an expanded rear end portion 58a of that shaft to limit the forward and rearward movement of the shaft to within a fixed range, a coil spring 59 which applies a bias force to shaft 58 and which is disposed between bracket 57 and retaining member 58b, and a bracket 60 which is fixedly attached to the rear end of tray 23 and into which the threaded portion of shaft 58 can screw. Other small peripheral components are also provided, to couple together the above components. When the disc player is transported, the threaded portion of shaft 58 should be screwed tightly into bracket 60.

Figure 16:
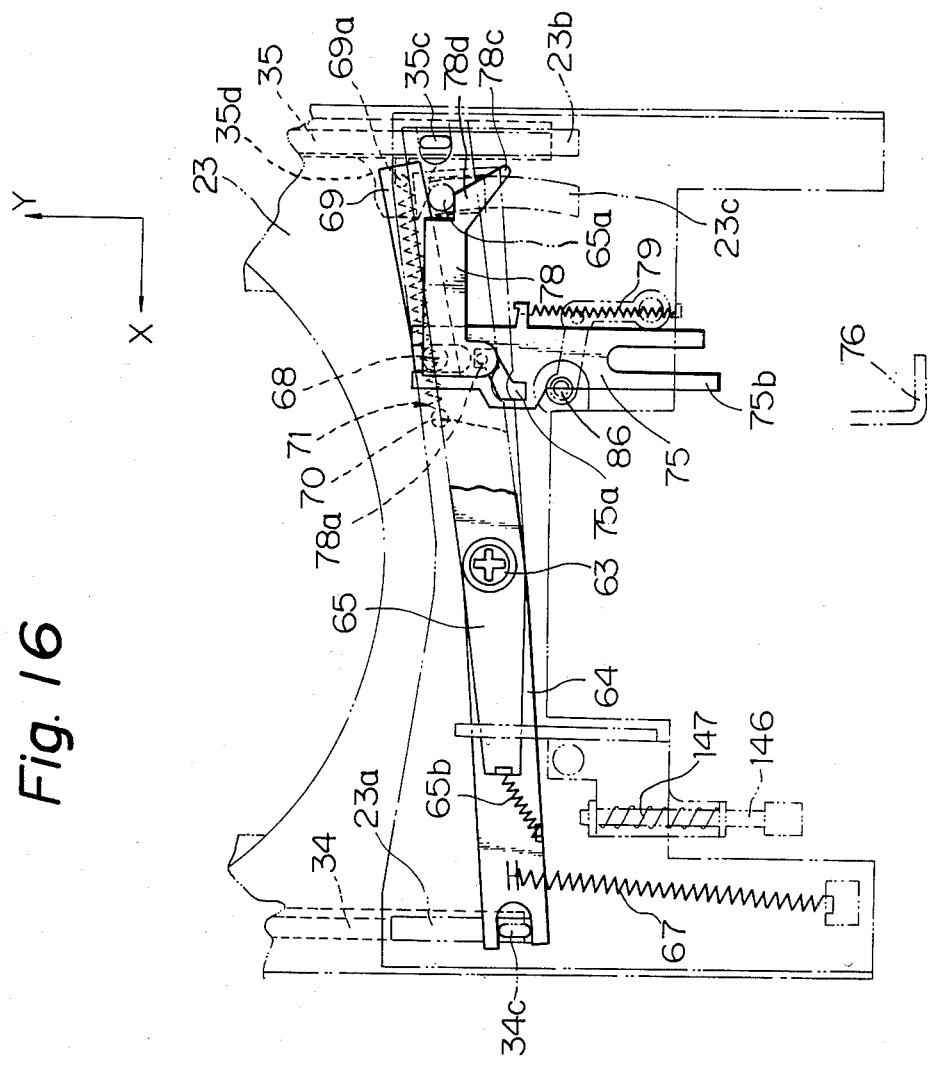
FIG. 16 is a partial plan view illustrating a linking mechanism which connects cam members in the described embodiment.
Figure 17:
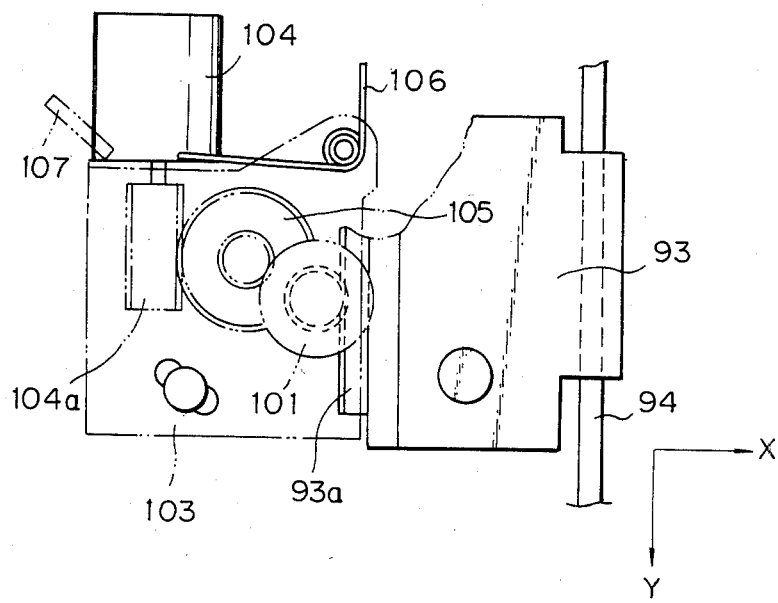
FIG. 17 and 18 are views in plan and partial cross-sectional elevation illustrating means for driving the pick-up system.
Figure 18:
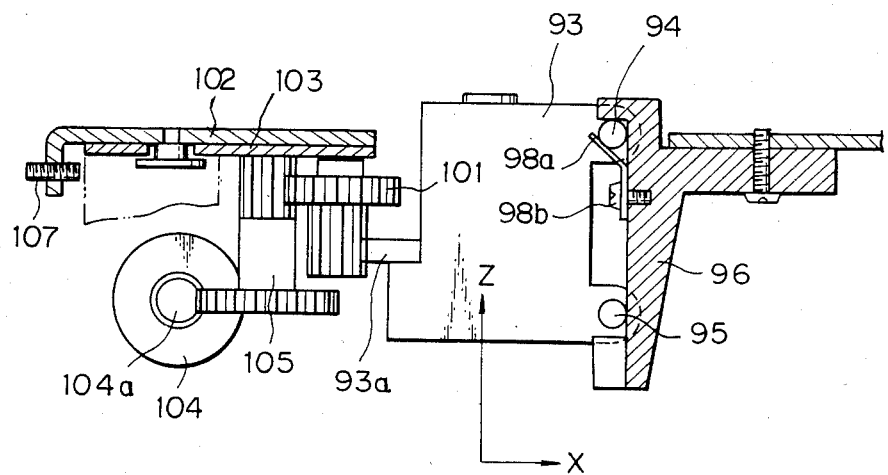

The means for linking cam members 34 and 35, disposed on each side of tray 23, will now be described. As shown in FIGS. 3, 5, 6 and 16. a supporting shaft 63 is mounted near the rear edge of tray 23, which extends in the vertical direction. A rotating lever 64 which can rotate substantially horizontally within a predetermined range is attached to supporting shaft 63, and engages at one end thereof with the rear protrusion 34c of cam member 34. This rear protrusion 34c protrudes through tray 23, passing through an elongated aperture formed therein. Of the positions into which rotating lever 64 can move, that illustrated in FIG. 16 will be referred to as the non-operating position. That is the position in which rotating lever 64 has rotated to the maximum possible extent in the counter-clockwise direction (as viewed in FIG. 16) with rear protrusion 34c of cam member 34 abutting against the rear edge of elongated aperture 23a. If rotating lever 64 rotates from that position in the clockwise direction (as seen in FIG. 16) until rear protrusion 34c engages with the front edge of elongated aperture 23a, i.e. has rotated to the maximum degree in the clockwise direction, then the resulting position of rotating lever 64 will be referred to as the operating position.

A second lever, which will be referred to in the following as swinging lever 65 is rotatably supporting shaft 63, in contact with the upper face of rotating lever 64. One end of swinging lever 65 is coupled to a spring 67 while the other end is shaped scu as to engage and pivot about a rear protrusion 35c formed on cam member 35, i.e. the cam member to which drive force is applied. This rear protrusion 35c protrudes through an elongated aperture 23e which is formed in tray 23. Thus, swinging lever 65 can swing within a range of travel which is determined by the range of travel of protrusion 35c within elongated aperture 23b. A linking shaft 65a protruding from the lower face of swinging lever 65 near the floating end thereof (i.e. the end opposite to spring 67) passes through an aperture 64a which is formed in the opposite end of rotating lever 64 to rear protrusion 34c. Thus, swinging lever 65 can swing with respect to rotating lever 64 within limits which are defined by the front and rear edges of aperture 64a. In addition, the linking shaft 65a extends through an elongated aperture 23c formed in horizontal chassis 18 substantially parallel to elongated aperture 23b, i.e. linking shaft 65a protrudes downwards through tray 23, and engages with a blocking plate as described hereinafter.

Bias force is applied to one end of swinging lever 65 by a coil spring 65b which is coupled to rotating lever 64. The coil spring 67 is coupled to the left-hand end of rotating lever 64 as described above, and urges rotating lever 64 towards the non-operating position.

A flat member which will be referred to as floating plate 69 is rotatably supported by shaft 68, below the lower face of tray 23, free to swing about shaft 68 against the restraint of a coil spring 71. A pin 69a protrudes from the swinging end of this floating plate 69, and is rotatably enaged within a pivot member 35d which is formed on the inner face of of the rear end of cam member 35, this pivot member being disposed protruding inwardly, i.e. in the direction of the X arrow. As shown most clearly in FIG. 16, a supporting protrusion 70 is formed near shaft 68, which is positioned such that a straight line connecting the centers of the vertical axes of shaft 68 and protrusion 70 is aligned parallel to the direction of the X arrow, i.e. the right-left direction. In addition, the distance of protrusion 70 from cam member 35 is made greater than the distance between that cam member and shaft 68. A coil spring 71 is stretched between pin 69a on floating plate 69 and supporting protrusion 70, and applies a force to rotating lever 64 acting through pin 69 and cam member 35 (i.e. applied through pivot member 35d). This force acts as described in the following.

For the position shown in FIG. 16, with cam member 35 at its farthest limit of forward movement, coil spring 71 exerts hardly any force upon rotating lever 64. However when cam member 35 is driven to reach its rearmost limit position, coil spring 71 becomes extended, whereby the spring applies a force urging rotating lever 64 towards the operating position (described above). The coil spring 67 will be designated as first urging means, in the following. The floating plate 69, supporting protrusion 70, coil spring 71 and peripheral components coupled thereto, constitute second urging means whereby rotating lever 64 is urged towards the operating position thereof, with this urging force only being applied while rotation lever 64 is in that operating position. It will be understood that the second urging means formed in this manner act to securely hold rotating lever 64 in the operating position, after that position has been attained. Supporting shaft 63, rotating lever 64, swinging lever 65, the first urging means, and peripheral components coupled thereto constitute a linkage mechanism whereby cam members 34 and 35 on tray 23 are mutually linked.

A description will now be given of locking means whereby this linkage mechanism is held locked with respect to tray 23 until tray 23 has moved into a predetermined position within housing 6, referring to FIGS. 3, 4, 6 and 16. A cam plate 75, having cam groove 75a formed therein, is freely movable in the backward and forward directions. A protrusion 75b is formed on the rear end of cam plate 75, which can come into contact with a fixed contact member 76 mounted on horizontal chassis 18. In addition, a blocking plate 78 is rotatably supported on a shaft 68 which supports floating plate 69 in a freely floating manner. An engaging protrusion 78a protrudes from one end of blocking plate 78, and slidably engages in cam groove 75a of cam plate 75. The other end (designated as 78b) of blocking plate 78 engages with the coupling shaft member 65a which is fixed to the lower face oflever 65 protruding downward therefrom. In this way, due to the other end of blocking plate 78 being engaged with cam groove 75a, swinging movement of swinging lever 65 is blocked. In addition, a bias force is applied to cam plate 75 and blocking plate 78 by coil spring 79. When tray 23 reaches a predetermined position within housing 6, protrusion 75b of cam plate 75 comes into contact with fixed contact member 76, and is thereby moved forward. However cam groove 75 acts to rotate blocking plate 78, due to the forward movement of the cam plate, whereby the engaging relationship between coupling shaft 65a of swinging lever 65 and end 78b of blocking plate 78 is released. As a result, the locked condition of the linkage mechanism is released.

A guide portion 78c is formed at the tip of end portion 78b of blocking plate 78, which produces smooth and continuous sliding engagement between blocking plate 78 and coupling shaft 65a while floating lever 65 is swinging.

The cam plate 75, blocking plate 78, coil spring 79 and peripheral components coupled to these constitute a locking mechanism. This operates such that until tray 23 reaches a predetermined position within housing 6, with the center of rotation of disc 26 supported by container 27 in tray 23 being verically disposed with respect to the playing mechanism such as to coincide with the center of rotation of a supporting wheel (described hereinafter), the linkage mechanism described above which is based on rotating lever 64 and swinging lever 65 is held locked in place with respect to tray 23.

Figure 19:
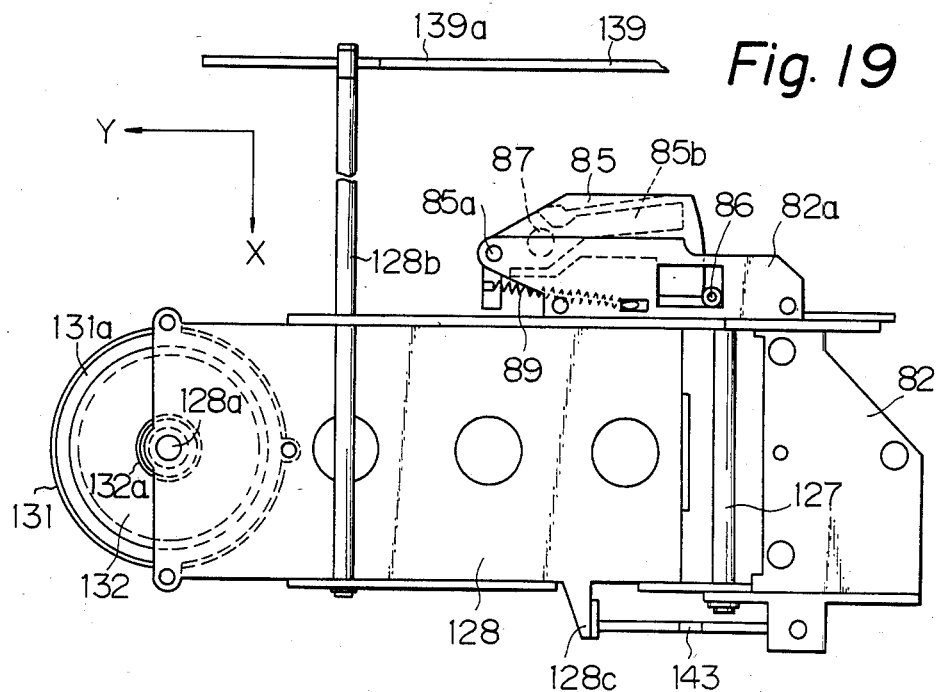
FIGS. 19 and 20 are partial views in plan and elevation respectively to illustrate details of a locking mechanism for the linking mechanism, and a clamping mechanism.

Blocking means will now be described, which prevent relative movement between tray 23 and housing 6 when tray 23 has reached the above-mentioned predetermined position within housing 6. As shown in FIGS. 3, 5, 6, 11 and 19, a supporting stage 82 is fixed to the upper face of the rear end of horizontal chassis 18. The fixed contact member 76 formed on the rear end portion of cam plate 75 described above, for contacting the protrusion 75b, is a part of supporting stage 82. A blocking member 83 is disposed on supporting stage 82 immediately above fixed contact member 76, which contacts a rear contact portion 23d (see FIG. 6) of tray 23, and blocks movement of tray 23 in the rearward direction into housing 6. Blocking member 83 forms part of supporting stage 82, as does fixed contact member 76. On an upper portion 82a of supporting stage 82, blocking lever 85 is supported by shaft 85a, while the front end of lever 85 is supported in a floating manner. As shown in FIGS. 6, 16 and 19, the rear face of blocking plate 85 can engage with blocking shaft 86 which protrudes upwards from the upper face of the rear end of tray 23. For the condition shown in FIG. 19, the rear end face of blocking lever 85 and blocking shaft 86 are not yet completely engaged. This condition is attained by blocking lever 85 swinging from the position shown in FIG. 19, in the clockwise direction (as viewed in FIG. 19) by a specific amount, whereby the rear end face of that lever becomes fully engaged with blocking shaft 86. This position will be called the blocking position of blocking lever 85. The position in which the rear end face of lever 85 and blocking shaft 86 are disengaged will be referred to as the non-blocking position of lever 85. That is to say, blocking lever 85 swings between the blocking position and the non-blocking position.

Figure 11:
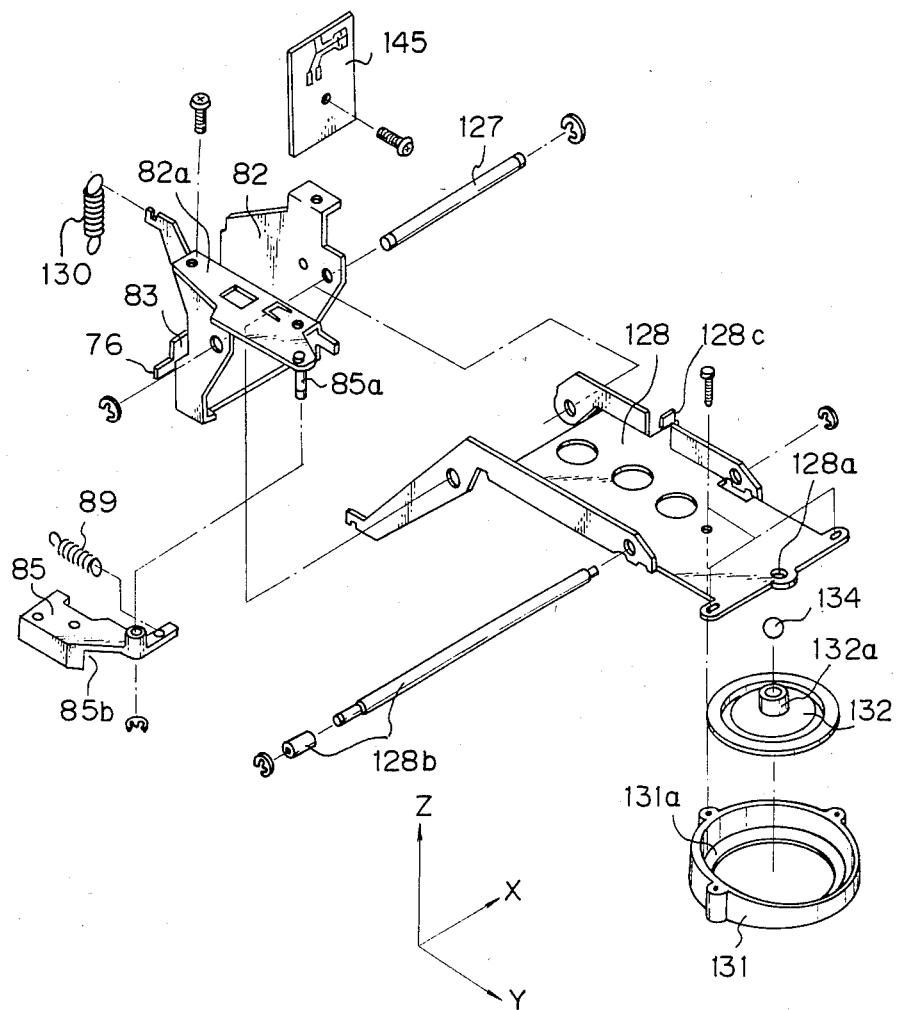
FIG. 11 is an oblique expanded view to illustrate components of a clamping mechanism.

As is made clear by FIGS. 5, 11 and 19, a cam portion 85b is formed on blocking lever 85, and engages with shaft member 87 (protruding from the upper face of swinging lever 65) when blocking lever 85 is in the blocking position. Floating lever 65 is disposed on engaging shaft 65a such that it can swing, while engaged with rotation ever 64, within a predetermined range of movement, i.e. as determined by aperture 64a in lever 64. Cam portion 85b is formed such that this swinging movement of swinging lever 65 within a predetermined range relative to rotating lever 64, produces a correspnding swinging movement of blocking lever 85 (due to shaft member 87 acting on cam portion 85b) whereby the rear face of blocking lever 85 engages fully against blocking shaft 86, so that movement of tray 23 in the outward direction from housing 6 is blocked. A coil spring 89 applies force to blocking lever 85 urging the lever into the non-blocking position described above.

The blocking member 83, blocking lever 85, blocking shaft 86, coil spring 89 and peripheral members linked thereto constitute blocking means which serve to prevent relative movement between tray 23 and housing 6 when tray 23 has reached a predetermined position within housing 6.

The disc carrier assembly formed of tray 23 and container 27, the supporting mechanism formed of horizontal chassis 18 and rails 19, 20, fixed bearing members 24a and 24b, the supporting leg assembly which supports the above supporting mechanism, cam members 34 and 35, the means for applying a drive force to cam member 35, the retaining member which retains the speed reduction mechanism that forms part of the latter drive force applying means, the linkage mechanism which which mutually couples cam members 34 and 35, the locking mechanism and blocking means which lock the linkage mechanism with respect to tray 23 until tray 23 has reached a predetermined position in housing 6, constitute a disc transport assembly which supports the disc to be played and carries the disc in a predetermined horizontal direction (i.e. rearward) and a predetermined vertical direction whereby the disc is moved into the playing position, and performs a reverse series of operations when a disc is to be unloaded from the player.

The means for playing disc 26 within housing 6 will now be described. As shown in FIGS. 3, 8, 12, 14, 17 and 18, a carriage 93 which supports an optical form of pickup (not shown in the drawings) for readout of data such as recorded music etc. from disc 26, is disposed on the lower face of horizontal chassis 18. At the right-hand side of carriage 93, a rack gear portion 93a is longitudonally disposed along the front-to-rear direction. At the left-hand side of of carriage 93, i.e. on the opposite side to rack gear portion 93a, a pair of guide shafts 94, 95 are fitted, which are spaced apart in the vertical direction and are aligned horizontally. These constitute guide means for guiding carriage 93. A supporting stage 96 is fixed to the lower face of horizontal chassis 18, and on the right-hand side of this supporting stage two pairs of contact faces 96a and 96b are disposed mutually opposing, in the manner shown in FIG. 8, i.e. these comprising an upper front and rear pir of contact faces 96a and a lower pair of contact faces 96b. The uppermost of the two guide shafts, i.e. shaft 94 is fixed to front and rear contact faces 96a by a pair of attachment members 98a and screws 98b. The lower guide shaft 95 is held in contact with the lower front and rear contact faces 96b. A switch 99a is positioned to be contacted by carriage 93 when this reaches the limit positions thereof for frontward and rearward movement respectively, and produces signals indicative of this. Switch 99a is attached through an attachment member 99b which is used to adjust the switch position relative to the carriage movement path. The structure formed by horizontal chassis 18 and supporting stage 96 etc, a supporting structure for supporting the guide means formed by guide shafts 94 and 95.

Figure 10:
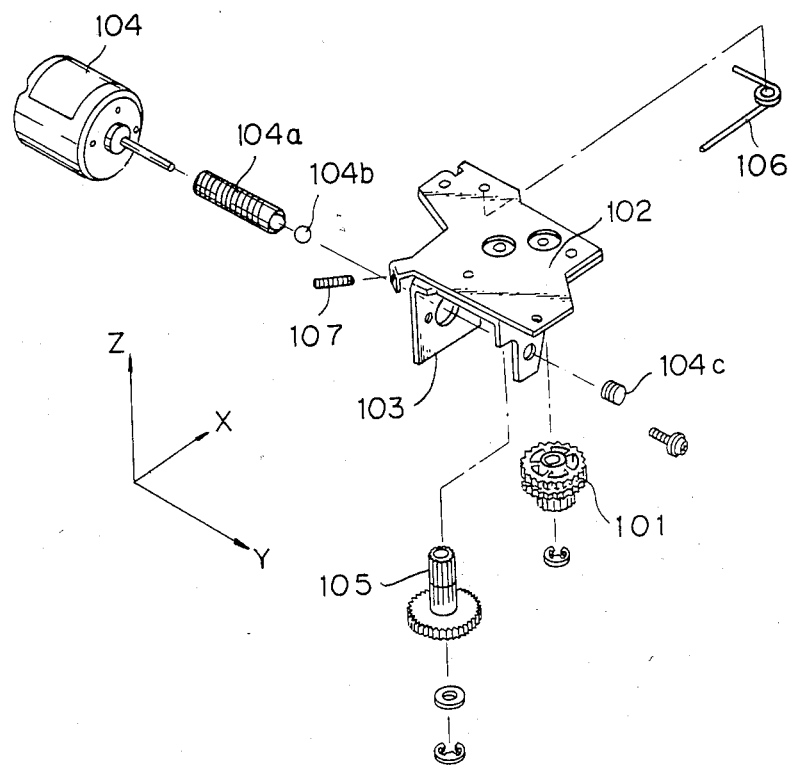
FIG. 10 is an oblique expanded view showing drive mechanism for driving the pick-up of the described embodiment.

As shown in FIG. 10, retaining member 103 is disposed on the lower face of horizontal chassis 18, and serves to rotatably retain gear wheel 101 near the front edge of that chassis. This gear wheel engages with rack gear portion 93a of carriage 93. Retaining member 103 is supported in a floating manner, attached to an intermediate plate 102 which is fixed to the lower face of horizontal chassis 18, by a shaft (not shown in the drawings) formed at the rear end of plate 102. A motor 104 is also attached to retaining member 103, with the output shaft of motor 104 having a worm 104a attached thereto, which is supported by spherical bearing 104b and bearing member 104c, the latter being mounted on retaining member 103. A worm wheel 105 is disposed such as to mesh with gear wheel 101 and worm 104a.

Motor 104, worm 104a and worm wheel 105 constitute a drive source for driving gear wheel 101. This drive source and gear wheel 101 constitute drive force application means for applying a drive force to carriage 93. As a result of a spring member 106, the bearing member 103 supporting gear wheel 101 and the drive source described above, applies a force urging gear wheel 101 against rack gear portion 93a of carriage 93. In order to prevent an excessive amplitude of swinging movement of retaining member 103, which would result in separation of gear wheel 102 from rack gear portion 93a, a blocking screw 107 is screwed into intermediate plate 102 such as to engage with retaining member 103.

As shown in FIGS. 3, 7, 9, 12, 14, 21, 22, 23 and 24, a spindle motor 112 is disposed, to rotate support wheel 111 (i.e. the turntable) which supports disc 26, with the motor drive shaft axis being vertically aligned upon a line extending from the path of movement of carriage 93. Support wheel 111 is provided with a movable portion 111b which receives a bias force from a coil spring 111a, and is slidable in the vertical direction. A supporting leg mechanism 114 is disposed on horizontal chassis 18, on the opposite side of spindle motor 112 from the pickup unit, aligned substantially parallel to the optical axis of a light beam which illuminates disc 26 and aligned along a line extending from the path along which that light beam moves. As is most clearly seen in FIG. 23, supporting leg mechanism 114 is formed of a substantially tubular bolt member 114a, which rotatably engages with horizontal chassis 18 and which has the lower end thereof of expanded diameter, a nut 114b which is screwed onto bolt member 114a, a spring washer 114c which acts in conjunction with the lower expanded portion of bolt member 114a and nut 114b to fixedly attach the bolt assembly to horizontal chassis 18, a cap 114d which is screwed onto the lower end of bolt member 114a, and a screw 114e which screws into a threaded portion formed in the periphery of bolt member 114a and whose upper end contacts the inner face of cap 114d. That is to say, in order to fixedly attach cap 114d in position, first the nut 114d and screw 114e are tightened, then by rotating bolt member 114a the height of the supporting leg mechanism is adjusted.

In addition to this supporting leg mechanism 114, horizontal chassis 18 is also provided with a pair of supporting leg mechanisms 115 and 116, which are disposed substantially symmetrically opposite about a line extending from the path of movement of the optical axis described above and extend in the same direction as supporting leg mechanism 114. These mechanisms 115 and 116 are each of identical configuration to mechanism 114, and can be adjusted in height in the same manner.

A first adjustment member 118 is attached in common to the upper ends of each of the supporting leg mechanisms 114, 115 and 116. In addition, a supporting shaft 119 is fixed to first adjustment member 118, close to supporting leg mechanism 114 and to the line extending from the path of the optical axis. Supporting shaft 119 is disposed substantially parallel to that optical axis, i.e. extends in the vertical direction, and supports a second adjustment member 120 in a floating manner. Member 120 supports spindle motor 112. As shown in FIGS. 21, 22, 23 and 24, a tubular pin 122a having the lower end thereof expanded in diameter is fitted on the floating portion of second adjustment member 120. A spindle washer 122b is disposed between the expanded portion of pin 122a and the second adjustment member 120. In addition, screw 122c is fitted into pin 122a, and protrudes through a slit 118a which is formed in first adjustment member 118. A nut 122d is screwed onto screw 122c. An elongated aperture 120a is formed in second adjustment member 120, spaced apart from pin 122a by a specific distance, and shaft member 123 protrudes through elongated aperture 120a. It is desirable that shaft member 123 and pin 122a are disposed on the same circumference, concentric with the axis about which second adjustment member 120 swings. Shaft member 123 comprises a screw portion 123a, an expanded portion 123b and a hexagonal head 123c. The screw portion 123a and hexagonal head 123c are concentric, and the central axis of expanded portion 123b pk is offset from the central axis of screw portion 123a and hexagonal head 123c by a fixed amount. A cover 121 is mounted on horizontal chassis 18 such as to cover first adjustment member 118 and second adjustment member 120. Screw portion 123a fits in aperture 118b formed in first adjustment member 118, and protrudes outwards from that member. A nut 124 is screwed onto screw portion 124a, so that by tightening nuts 122d and 124, shaft member 123 and hexagonal head 123c become clamped. By then rotating shaft member 123, second adjustment member 120 is set in a floatingly supported condition.

The pin 122a, spring washer 122b, screw 122c, nut 122d and shaft member 123 constitute attachment means for attaching the second adjustment member 120 to first adjustment member 118, at an arbitrarily determinable floatingly supported position. The supporting leg mechanisms 114, 115 and 116, and the first adjustment member 118, supporting shaft 119, second adjustment member 120 and the attachment means described above can also comprise an integral part of the supporting mechanism described hereinabove which is formed of horizontal chassis 18 etc. Furthermore, supporting wheel 111, spindle motor 112, carriage 93, the drive force application means for applying drive force to carriage 93, the supporting mechanism which includes horizontal chassis 18, the guide means comprising guide shafts 94 and 95, and associated peripheral components, constitute playing means for playing disc 26.

Figure 20:
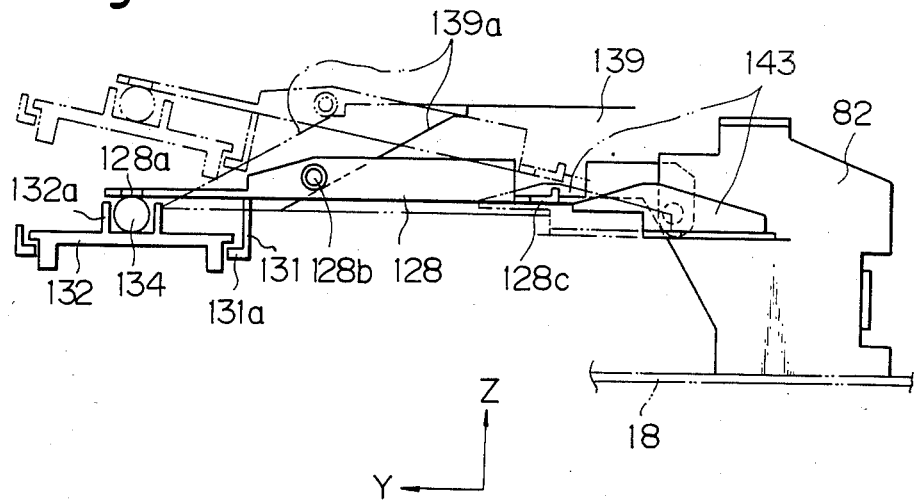
Figure 21:
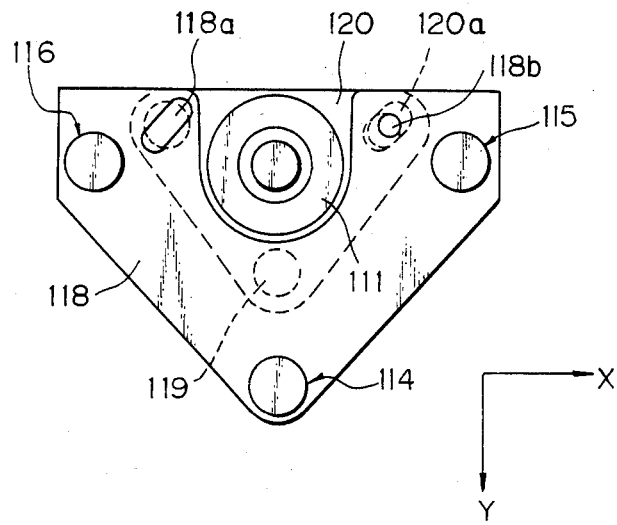
FIGS. 21 to 24 are diagrams for illustrating details of a disc supporting and rotating portion of the playing mechanism of the described embodiment.
Figure 22:
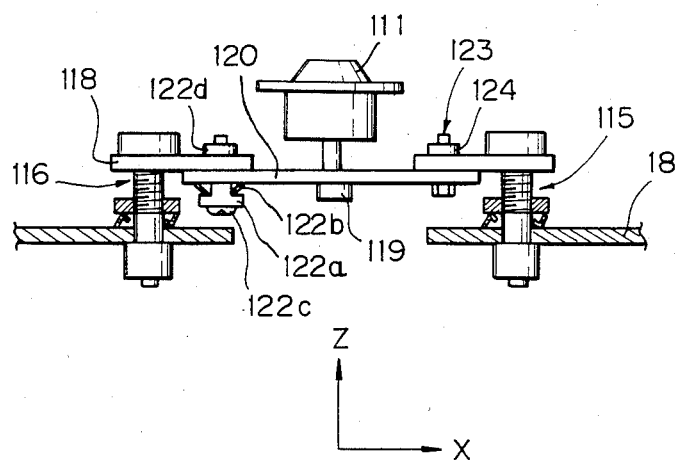
Figure 23:
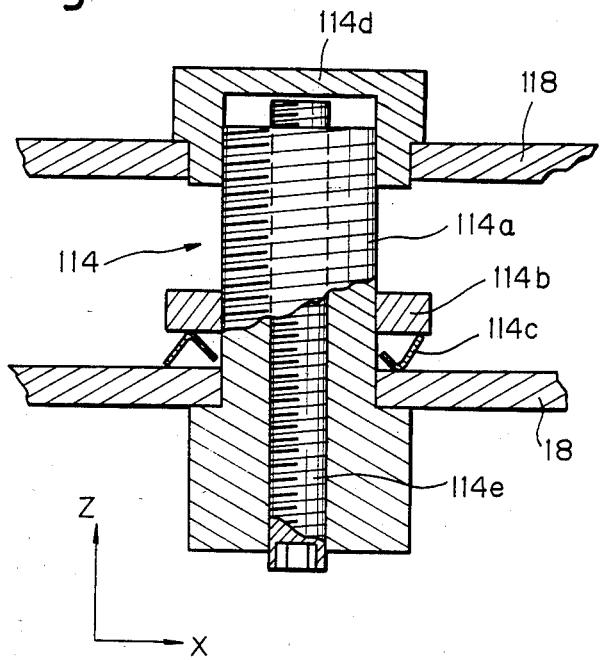
Figure 24:
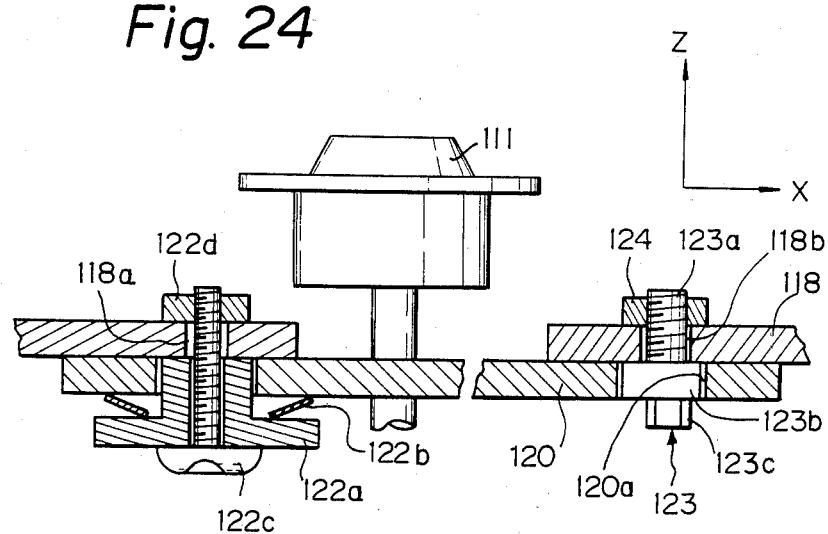
Figure 25:
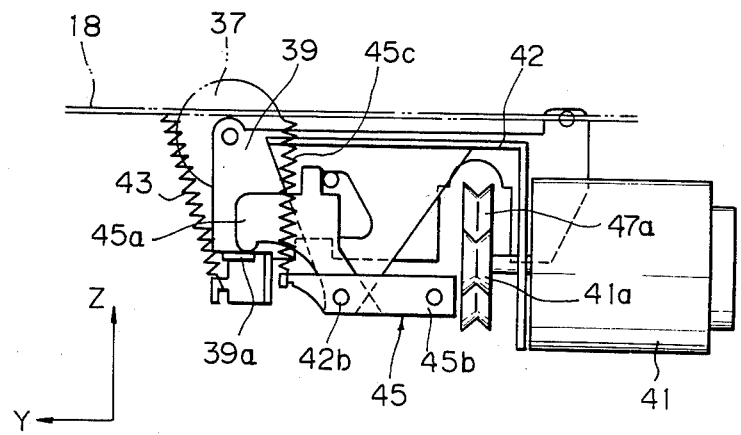
FIGS. 25 and 26 are views in elevation to illustrate details of a system for driving the disc transport mechanism.
Figure 26:
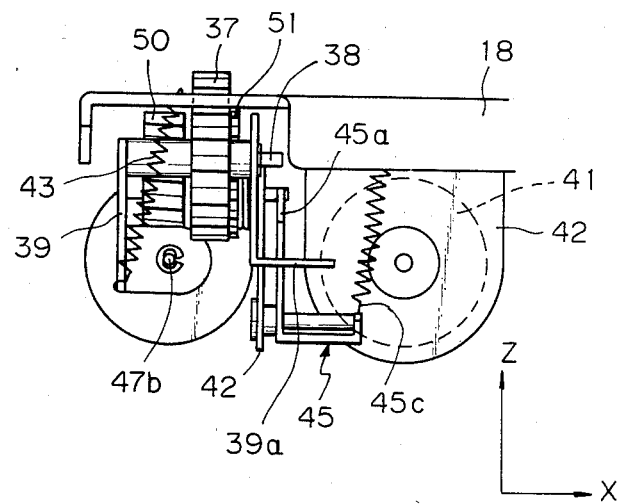

A clamping mechanism will now be described, which clamps disc 26 in place after it has been set into the playing position. As shown in FIGS. 2, 3, 5, 7, 11, 19 and 20, a supporting member 128 is rotatably supported to swing about a shaft 127 mounted on supporting stage 82 which is fixed to the rear upper face of horizontal chassis 18. The position shown by the full-line outline in FIG. 20 is that for which supporting member 128 is clamped, with a pressure application member (described hereinafter) in contact with disc 26. The position indicated by the double-chain line outline will be referred to as the non-clamped position of supporting member 128, which can swing between the clamped and non-clamped positions. The rear end of supporting member 128 is coupled to a coil spring 130 which is also coupled by one end to supporting stage 82. This coil spring 130 urges supporting member 128 towards the clamped position. In addition, supporting member 128 has the upper end of a tubular member 131 fixed thereto. Pressure member 132 is disposed within the interior of tubular member 131 such as to be completely enclosed thereby. A control portion 131a is provided on the lower end of tubular member 131, for controlling the movement of pressure member 132. The pressure member 132 acts in conjunction with supporting wheel 111 to clamp disc 26 which is mounted on that wheel. On the upper face of pressure member 132, a tubular portion 132a is formed. Supporting member 128 is disposed opposite the rear pressure face of pressure member 132.

A spherical bearing member 134 formed of metal or synthetic resin is mounted within tubular portion 132a of pressure member 132. A circular aperture 128a, which has a smaller diameter of opening than the diameter of bearing member 134, is formed in supporting member 128. It should be noted that the design is not limited to the use of a circular aperture 128a, but any form of concave engaging portion can be employed which has a diameter of opening that is smaller than the diameter of bearing member 134 and which can engage with bearing member 134. The supporting member 128, tubular member 131, and bearing member 134 constitute a supporting mechanism for rotatably supporting pressure member 132.

In the following, the interior diameter of the tubular portion 132a formed in pressure member 132 will be designated as $\phi a$, the diameter of bearing member 134 as $\phi b$, the interior diameter of tubular member 131 as $\phi c$, the diameter of pressure member 132 as $\phi d$, and the diameter of the circular aperture portion 128a formed in supporting member 128 as $\phi e$. It is necessary for the following two conditions to be satisfied:

$$\phi a - \phi b + \phi c - \phi d < \phi e \quad (1)$$

$$\phi a - \phi b < \phi c - \phi d \quad (2)$$

Equation (1) represents the condition that, when pressure member 132 presses upon disc 26, bearing member 134 will accurately engage with circular aperture 128a. Equation (2) represents the condition which must be satisfied to ensure that pressure member 132 can rotate without engaging the interior face of tubular member 131 while bearing member 134 is engaged in circular aperture 128a.

A guide plate 138 is fixedly attached to the right-hand edge of horizontal chassis 18, and a cam body 139 is movably attached with respect to forward and rearward movement upon guide plate 138. Cam body 139 engaged with cam member 35 (i.e. the cam member to which drive force is applied), that is to say, cam body 139 moves in accompaniment with motion of cam member 35 towards the rear. The front edge portion of cam body 139 is formed with a cam portion 139a which engages against engaging shaft 128b. Cam portion 139a is inclined downwards (i.e. as seen moving from front to rear) that is to say, the cam portion is formed such as to apply a force to engaging shaft 128b acting in a direction tending to separate supporting member 128 and pressure member 132 from the disc supporting face of container 27, as cam body 139 is moved in the frontward direction.

In addition, cam body 139 is urged in the frontward direction by a coil spring 140 which is coupled to the rear edge of guide plate 138 by one end thereof.

A detection switch 141 is fixedly attached to the rear edge of guide plate 138, for producing a signal indicating that cam body 139 has completed its rearward movement. This signals is produced when a protrusion 139b on cam body 139 contacts switch 141.

The supporting member 128, coupling shaft 130, tubular member 131, pressure member 132, bearing member 134, cam body 139, and coupling shaft 140 constitute a clamping mechanism which acts to clamp disc 126 in place after the disc has been carried into the playing position.

Figure 7:
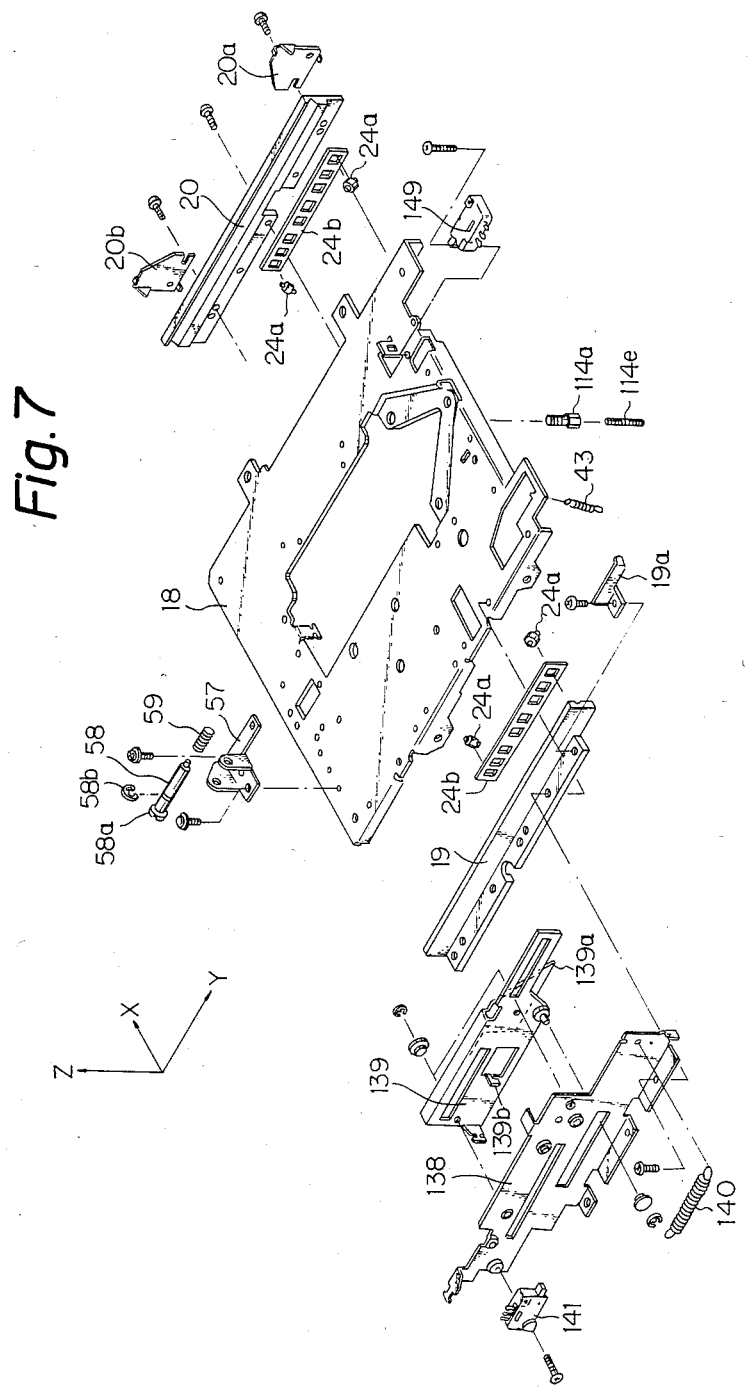
FIG. 7 is an oblique expanded view illustrating a supporting structure of a disc transport mechanism in the described embodiment.
Figure 8:
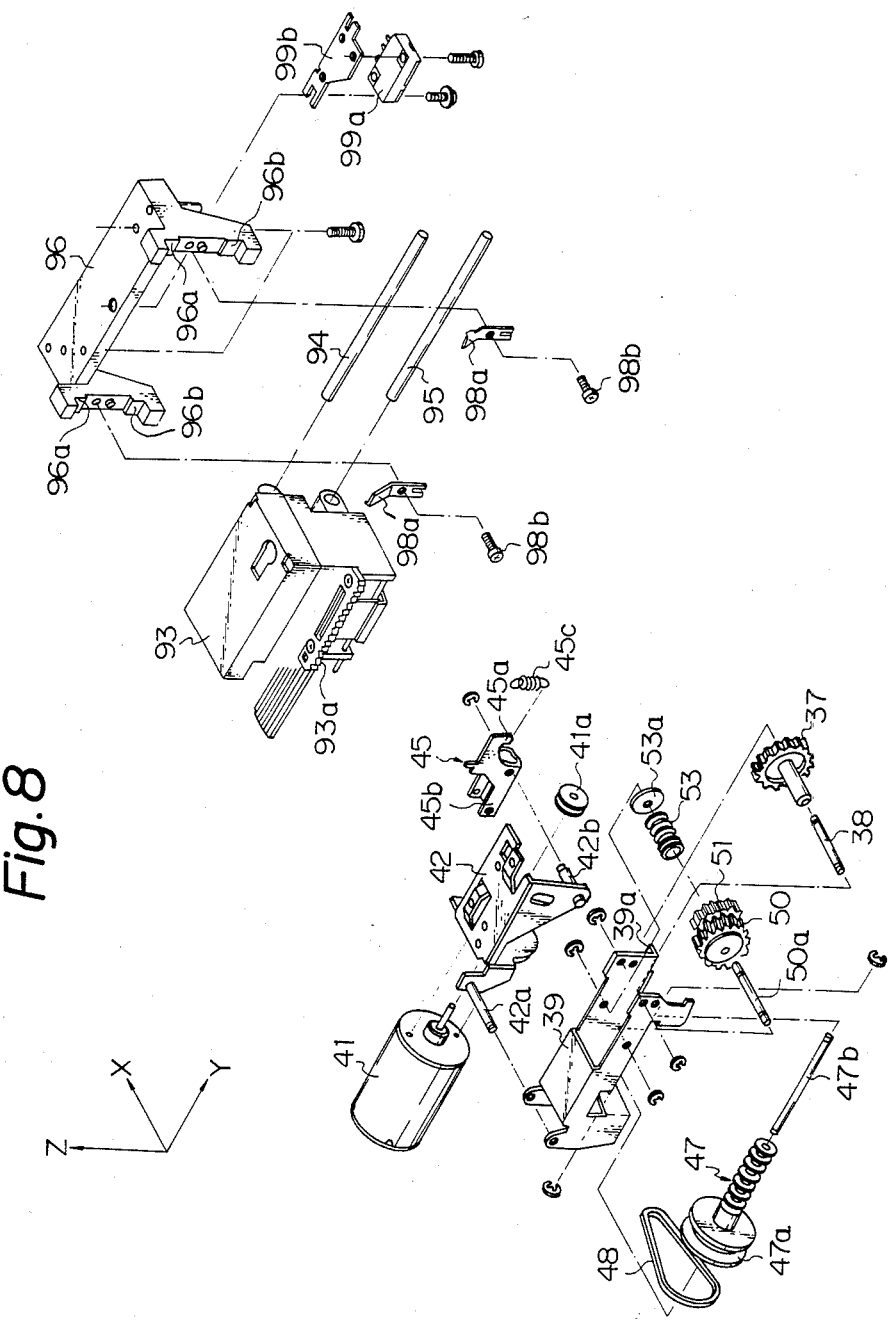
FIG. 8 is an oblique expanded view illustrating the configuration of a drive mechanism for the disc transport mechanism and of a read-out mechanism in the described embodiment.

As shown in FIGS. 3, 6 and 19, a separation member 143 is fixedly attached on the upper rear face of tray 23, disposed between pressure member 132 of the clamping mechanism and the disc supporting face of container 27. Separation member 143 engages with engaging protrusion 128c which is formed on supporting member 128, whereby pressure member 132 and shaft member 128 are held retained while being separated by a fixed distance from the disc supporting face of container 27. A contact rod 146 is slidably mounted on separation member 143 such as to permit movement in the front/rear directions, such as to be capable of contacting a contact baseplate 145 fixed to supporting stage 82 (mounted on supporting member 128). This contact rod 146 and contact baseplate 145 constitute in conjunction a contact switch. A coil spring 147 is arranged such as to apply a bias force to contact rod 146. This contact switch produces a signal to indicate when tray 23 reaches a predetermined position, i.e. the limit position of rearward movement. In addition, as shown in FIG. 3 and FIG. 7, a detection switch 149 is mounted on the front edge of horizontal chassis 18, which serves to detect when tray 23 has reached the limit position of forward movement thereof.

Detection signals produced by detection switches 99a and 141, by the contact switch made up of contact rod 146 and contact baseplate 145, and detection switch 149, are sent to a control section (not shown in the drawings) provided within housing 6. In response, this control section produces operating signals whereby motors 41 and 104 and spindle motor 112 are set in operation at predetermined timings as described hereinafter.

Figure 29:
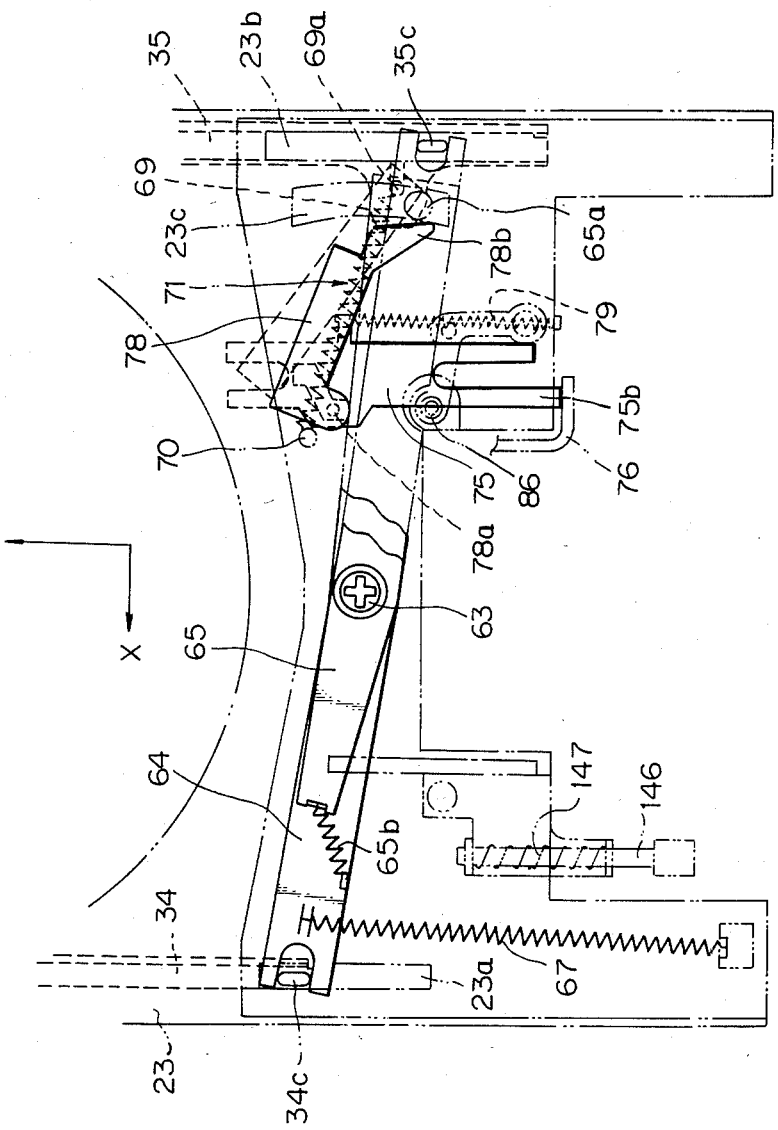
FIG. 29 is a partial view in plan to illustrate the condition of a linking mechanism when a disc has been set in the playing position.

A simple description of the sequence of operations whereby a disc is played by this front loading disc player will now be given, referring to FIG. 29 in particular.

Figure 1:
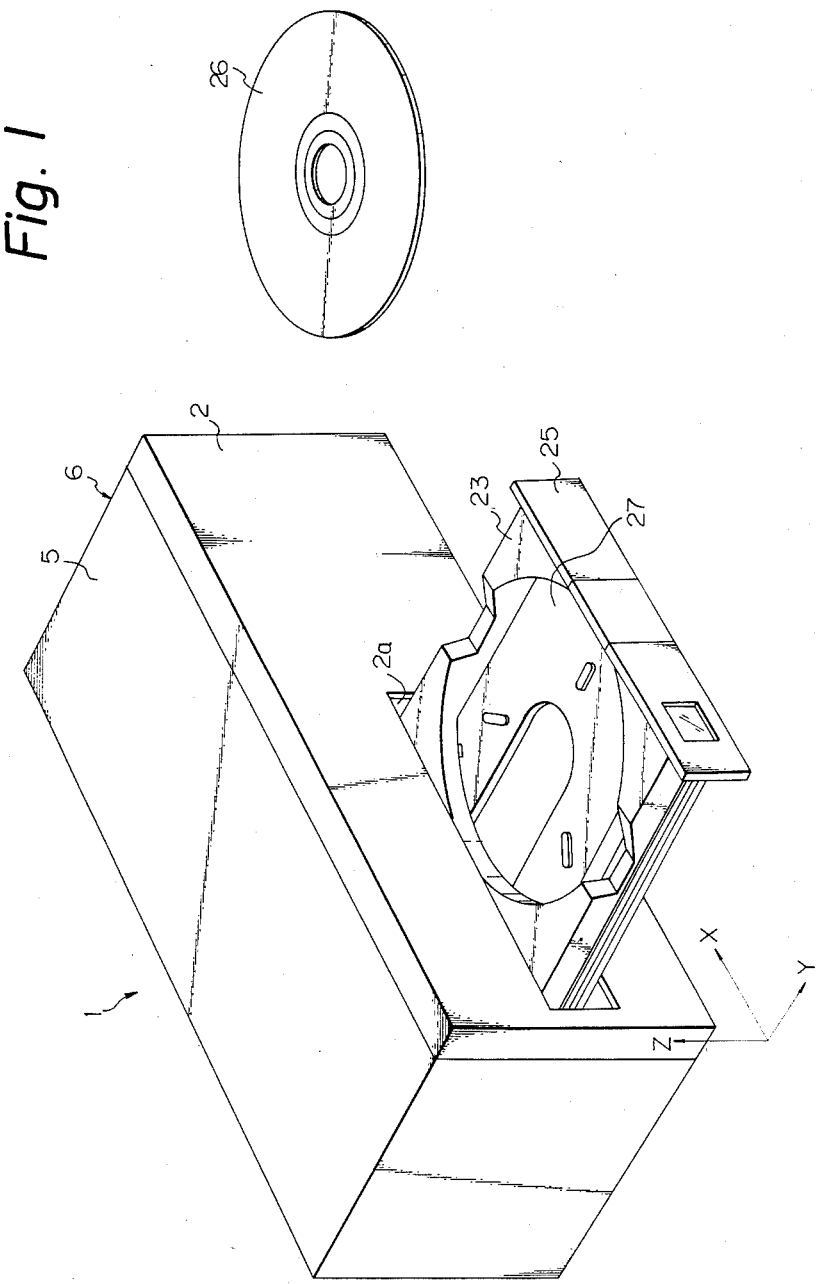
FIG. 1 is an oblique external view of a front-loading disc player according to the present invention, showing a carrier mechanism in an outwardly protruding position.
Figure 2:
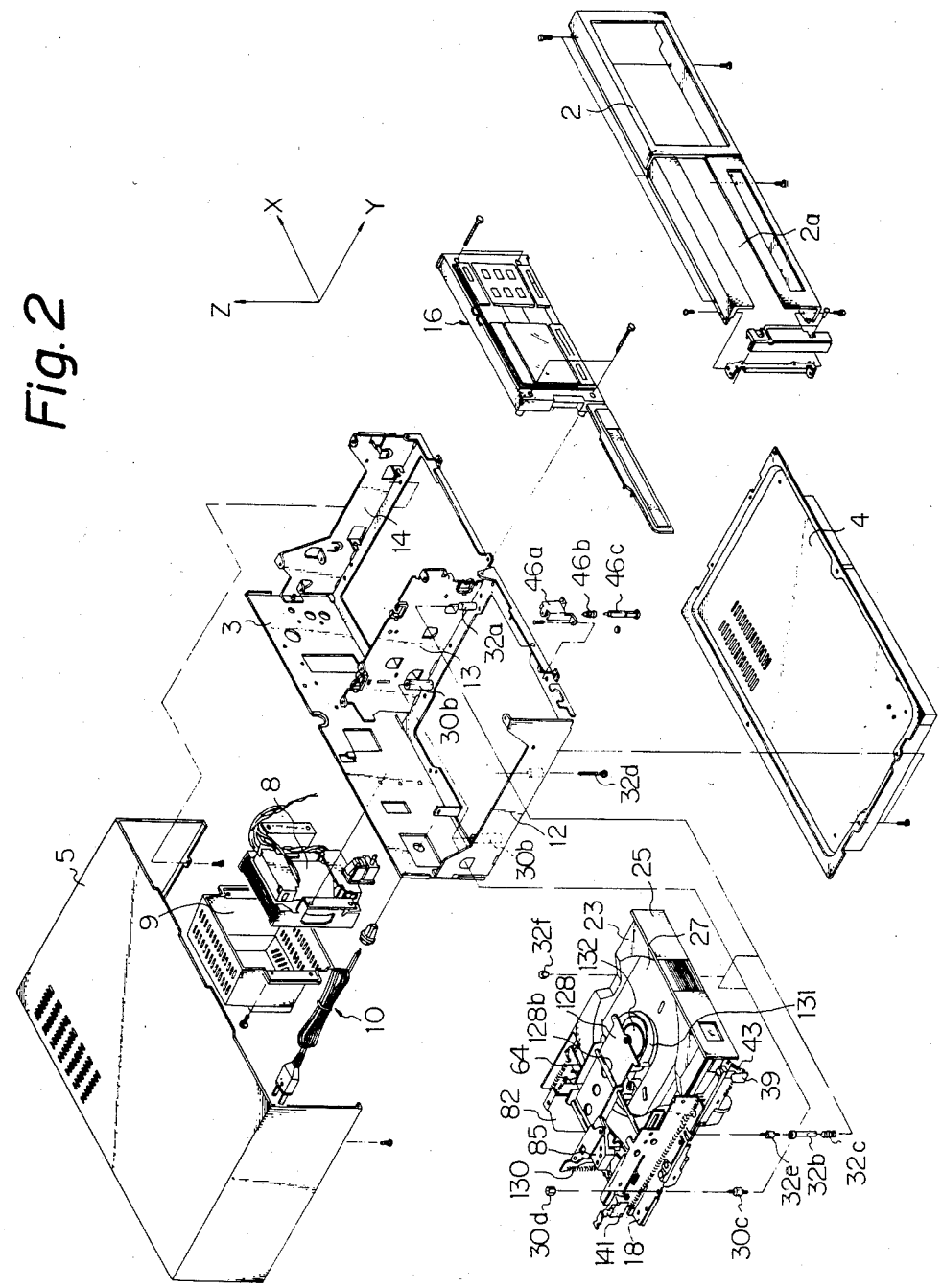
FIG. 2 and FIG. 3 are oblique expanded views illustrating the various components of an embodiment of a front-loading disc player according to the present invention.

Firstly, disc 26 is placed in the tubular concave portion of tray 23, with tray 23 protruding outward from housing 6 as shown in FIG. 1, to thereby lie upon the disc support face of container 27. At this stage, it should be noted that the sequence of operations whereby tray 23 is carried outward to protrude from housing 6, after completion of playing a disc, is the exact inverse of the sequence which will now be described. The operations for implementing protrusion of tray 23 from housing 6 will therefore not be described in detail.

With disc 26 now loaded in tray 23, the user depresses a "load" pushbutton provided on operating section 16

(shown in FIG. 2). Motor 41 is thereby set into rotation, whereby gear wheel 37 rotates and cam member 35 is driven in the rearward direction. At this time, the linking mechanism between cam members 34 and 35 is locked, so that cam members 34 and 35 and tray 23 are driven inward as a unit. When tray 23 has reached a predetermine position, i.e. with the axis of rotation of disc 26 coinciding with the axis of rotation of supporting wheel 111, then rear contact portion 23d of tray 23 comes into contact with blocking member 83 protruding from supporting stage 82 (see FIGS. 3 and 11), which thereby prevents further rearward movement of tray 23. At this time, the contact switch formed by contact baseplate 145 and contact rod 146 is actuated, generating a signal to confirm that tray 23 has reached the predetermined position described above. As shown in FIG. 29, just before tray 23 reaches that position, the rear edge protrusion 75b of cam plate 75 contacts the fixed contact member 76 provided on supporting stage 82, and cam plate 75 moves forward by approximately 1 mm against the bias force exerted by coupling shaft 79. Due to this forward movement of cam plate 75, blocking plate 78 (which was previously prevented from rotating by the forward edge portion of cam slot 75a formed in cam plate 75) becomes free to rotate. Thus, swinging lever 65, which is linked to the rear right-hand edge of blocking plate 78, is set in a condition in which it is free to swing about engaging shaft 65a. The locked state of the linking mechanism coupling cam members 34 and 35 is thereby released.

As motor 41 continues to rotate, cam member 35 continues to be driven rearward. However due to the release of the linking mechanism, the left-hand cam member 34 is moved in the forward direction. Thus, as is clear from FIG. 6, shaft portions 27b protruding from each side of container 27, will slide in cam apertures 34a, 35a in cam members 34, 35 respectively, whereby container 27 (supporting disc 26) will move downward under its own weight. Thus, the central aperture in disc 26 will engage with movable portion 111b of support wheel 111, whereby disc 26 becomes mounted upon support wheel 111. At this time, the disc supporting face of container 27 becomes separated from disc 26, so that disc 26 can now rotate together with support wheel 111.

Figure 9:
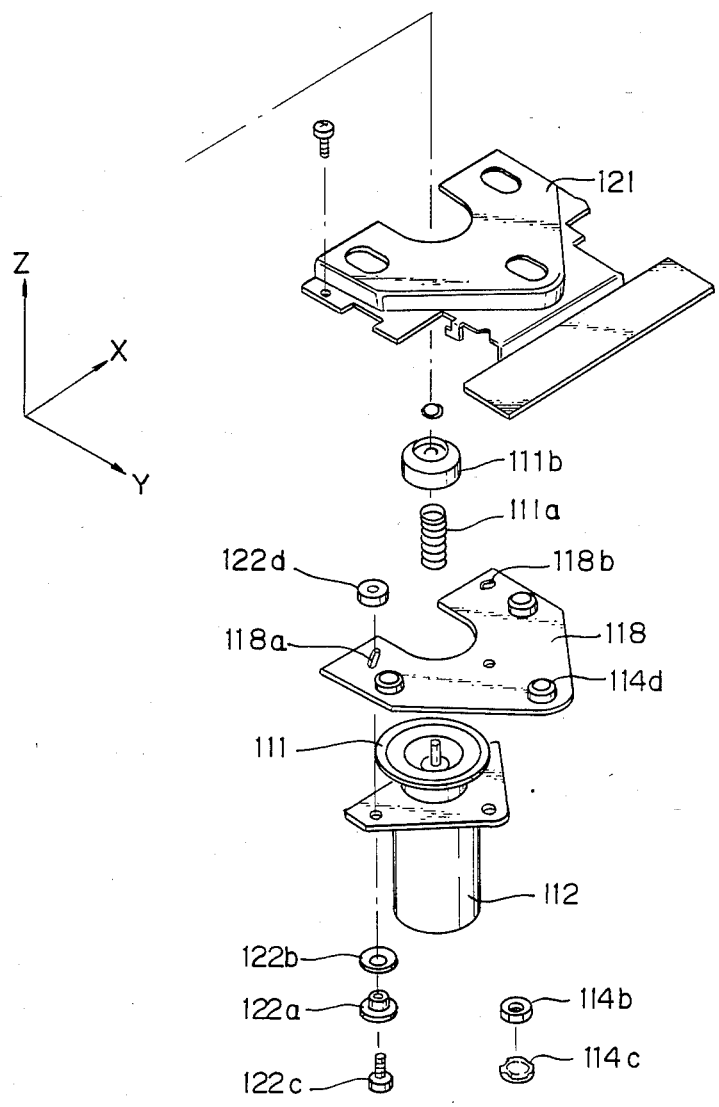
FIG. 9 is an oblique expanded view to illustrate components of the playing mechanism.

As shown in FIG. 19, when tray 23 reaches the predetermined position within housing 6 described above, blocking shaft 86 protruding from the rear end of tray 23 (shown in FIGS. 3, 6, 16, 28 and 29) attains a position in which it engages with the rear end face of blocking lever 85, which is rotatably mounted on extension portion 82a of the rear end of supporting stage 82. In addition, engaging shaft 65a becomes positioned near the entry section of cam portion 85b formed on blocking lever 85. In FIG. 19, swinging lever 65 is omitted, and only the engaging shaft portion 87 protruding from lever 65 is shown. Also in FIG. 19, the linking mechanism including swinging lever 65 is shown in the condition prior to being operated to reach the condition shown in FIG. 29. As swinging lever 65 swings towards the rear, the engaging shaft 87 of that lever engages with cam portion 85b of blocking lever 85, and thereby swings lever 85 in the clockwise direction, as shown in FIG. 9, against the urging force exerted by a coil spring 89 which is coupled to restrain rotation by blocking lever 85. The rear end face of blocking lever completely engages with blocking shaft 86, whereby further movement of tray 23 in the outward direction is prevented.

Furthermore, as shown in FIG. 20, as container 27 moves downwards, cam body 139 engaged with cam member 35 (see FIGS. 3, 5 and 7) is moved towards the rear. Thus, shaft 128b mounted in supporting member 128, which engages aginst a downwardly inclined face (as viewed moving from rear to front of the housing) of a portion 139a of cam body 139, moves downwards, i.e. supporting member 128 swings downwards, and pressure member 132 becomes pressed against disc 26 to thereby clamp the disc in place.

When cam body 139 moves rearward to the limit position, then as shown in FIG. 7, protrusion 139b on cam body 139 engages with the detection switch fixed to guide plate 138, thereby actuating the switch. A signal is thereby generated whereby motor 41 is halted.

Playing of the disc can now commence.

When the operating signal to begin playing is produced, carriage 93 begins to move. When playing of the disc has been completed, then when an operating signal is produced to designate changeover of disc 26, tray 23 is carried frontward to protrude outward from housing 6 by the inverse of the process described hereinabove for inward movement of the tray. Disc 26 can then be removed by the user.

Immediately prior to movement of tray 23 outward from housing 6, cam body 139 is returned to the position which it occupied prior to actuation, thus returning the clamping mechanism to the unclamped condition. A force urging cam body 139 in the forward direction is exerted by coil spring 140. If this coil spring should weaken, over a long period of use, there is a danger that cam body 139 and hence the clamping mechanism may not fully return to the unclamped condition. As a result, as tray 23 moves to the outwardly protruding position, pressure member 132 might rub against the recorded face of disc 26 or against supporting member 128, or might catch against tray 23 or container 27 thereby hindering the outward movement of these. However in the present embodiment, this danger is eliminated by a separation member 143 fixedly mounted on tray 23 is positioned as shown in FIGS. 19 and 20. Separation member 143 has a profile, as seen in elevation in FIG. 20, with a front portion thereof shaped to incline downwards (i.e. as seen moving from rear to front of the housing) which is positioned such that as tray 20 begins to move in the outward direction, an outwardly projecting portion 128c of supporting member 128 engages against the latter inclined portion, whereby supporting member 128 is swung upwards during the first stage of the outward movement of the disc transport mechanism. Thus, the possible problem described above will not arise, with this embodiment of the present invention.

From the above description of the preferred embodiment, it will be understood that a front loading disc player according to the present invention provides the advantage of a simple and easily manufactured mechanism, which provides all of the operations required to automatically load and unload a disc, utilizing a single drive mechanism in conjunction with the operation of cam members and a linking mechanism.

Although the present invention has been described in the above with reference to a specific embodiment, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A front-loading disc player comprising:
a housing having an aperture formed in a substantially vertically oriented outer panel thereof;
playing means disposed within said housing for supporting and rotating a disc to read out the contents thereof;
a disc transport mechanism for transporting a disc to be played by said playing means, comprising a tray which is slidably mounted for movement directed inward and outward with respect to said housing along a substantially horizontal first predetermined direction, with at least a portion of said tray passing through said aperture, said tray having an aperture formed therein having a diameter greater than that of said disc, said disc transport mechanism further comprising a container mounted to permit only substantially vertically directed movement relative to said tray and having a portion thereof provided with a disc supporting surface being disposed at a lower part of said tray aperture, said container being provided with a plurality of engaging protrusions formed extending substantially horizontally therefrom, first and second cam members of elongated shape mutually disposed on opposite sides of said tray substantially parallel to said first predetermined position and slidably mounted on said tray for movement along said predetermined position, said cam members being respectively formed with a plurality of cam apertures of inclined shape formed therein, positioned to engage said engaging protrusions of said container such that said container is supported by said cam members, and further comprising an elongated rack gear portion formed along said first cam member, said disc transport mechanism further comprising a linking mechanism coupled to mutually link said first and second cam members such that movement of said first cam member along said first predetermined position produces a corresponding movement of said second cam member in the opposite direction, said tray being movable to a first predetermined position at which said tray aperture is disposed substantially entirely out of said housing and a second predetermined position at which said tray aperture is disposed within said housing with said disc aligned in a predetermined vertical relationship with respect to said playing means, said disc transport mechanism further comprising a rack drive gear wheel meshing with said rack gear portion of said first cam member, drive means coupled to said rack drive gear wheel, operable to rotate said rack drive gear wheel such as to drive said first cam member inward with respect to said housing along said first predetermined position, and locking means for locking said linking mechanism with respect to said tray while said disc transport mechanism is in any position other than said second predetermined position and for holding said linking mechanism in a freely operable condition when said disc transport mechanism is at said second predetermined position thereof;
said drive means being thereby operable to drive said disc transport mechanism inward with respect to said housing from said first predetermined position to said second predetermined position with a disc mounted on said container supporting surface, acting through said rack drive gear wheel, said rack gear portion, and said first cam member fixedly coupled to said tray by said locked linking mechanism, and, when said second predetermined position is reached and said locked condition of said linking mechanism is released, acting to drive said first cam member further inward with respect to said housing, said linking mechanism thereby being moved from a non-operating position thereof in which said disc is supported by said container supporting surface to an operating position thereof in which said container is lowered to mount said disc on said playing means.

2. A front-loading disc player according to claim 1, in which said drive means comprise a motor and a speed reduction mechanism coupled between a drive shaft of said motor and said rack drive gear wheel.

3. A front-loading disc player according to claim 2, in which said speed reduction mechanism comprises a worm which is fixedly mounted on said motor drive shaft, a worm wheel fixedly meshing with said worm, a unidirectional clutch mechanism coupled between said worm wheel and said rack drive gear wheel, said unidirectional clutch mechanism acting to transfer drive force from said worm wheel to said rack drive gear wheel and to prevent transfer of appreciable force from said rack drive gear wheel to said worm wheel and worm, at least for a direction of force resulting from said disc transport mechanism being forcibly pushed inward with respect to said housing.

4. A front-loading disc player according to claim 3, in which said unidirectional clutch mechanism comprises first and second gear wheels rotatably mounted upon a common shaft, and urging means for urging said first and second gear wheels into mutual contact acting along the axis of said common shaft, each of said first and second gear wheels having annular portions of the mutually contacting faces thereof formed with a sawtooth profile, as viewed perpendicular to the axis of said common shaft.

5. A front-loading disc player according to claim 4, in which said first gear wheel is constituted by said worm wheel.

6. A front-loading disc player according to claim 4, in which a viscous and relatively adherent substance is disposed between said mutually contacting faces of said first and second gear wheels.

7. A front-loading disc player according to claim 5, and further comprising friction application means for establishing frictional force acting to oppose rotation of at least one of said worm and said worm wheel, to reduce the amount of backlash therebetween.

8. A front-loading disc player according to claim 7, in which said friction application means are constituted by said urging means.

9. A front-loading disc player according to claim 4, in which said urging means comprise a coil spring and at least one washer, mounted coaxially on said common shaft, for applying an axially directed force to one of said first and second gear wheels.

10. A front-loading disc player according to claim 1, and further comprising first urging means coupled to said linking mechanism for urging said linking mechanism towards said non-operating position thereof and second urging means coupled to said linking mechanism for urging said linking mechanism towards said operating position thereof, said second urging means being operative only when said operating position is attained.

11. A front-loading disc player according to claim 1 and further comprising pivot means respectively provided on said first and second cam members, and in which said linking mechanism comprises a rotating lever rotatably mounted on a supporting shaft attached to said tray, with one end of said rotating lever pivoting about said second cam member pivot means, and moreover comprising a swinging lever which is rotatably mounted on said supporting shaft coaxially with said rotating lever and is engaged with said rotating lever at a position on the opposite side of said supporting shaft from said second cam member such as to permit said swinging lever to swing about said supporting shaft within a predetermined range relative to said rotating lever, with one end of said swinging lever pivoting about said first cam member pivot means, and in which said first urging means comprise a spring coupled between said tray and said rotating lever and said second urging means comprise a spring coupled between said rotating lever and said swinging lever.

12. A front-loading disc player according to claim 1, and further comprising blocking means for preventing relative movement between said disc transport mechanism and said housing after said second predetermined position has been attained by said disc transport mechanism.

13. A front-loading disc player according to claim 12, in which said blocking mechanism comprises:
a blocking shaft fixedly mounted protruding from said tray;
a shaft member fixedly mounted protruding from said linking mechanism;
a blocking member fixedly mounted with respect to said
housing, positioned to contact said tray when said
disc transport mechanism attains said second predetermined position, such as to block further inward movement of said tray with respect to said housing;
a blocking lever rotatably mounted in said housing, positioned such as to permit swinging movement thereof between a blocking position in which said blocking lever engages against said blocking shaft such as to prevent outward movement of said tray with respect to said housing, and a non-blocking position in which said blocking lever is disengaged from said blocking shaft, said blocking being formed with a cam portion positioned to engage against said shaft member and positioned relative to said shaft member such that movement of said shaft member as said linking mechanism moves from said non-operating position to said operating position forces said blocking lever into said blocking position thereof; and
spring means for urging said blocking lever towards said non-blocking position thereof.

14. A front loading disc player according to claim 1, and further comprising clamping means for rotatably clamping said disc with respect to said playing means when said disc transport mechanism is in said second predetermined position thereof.

15. A front loading disc player according to claim 1, and further comprising sensing means for detecting the position of said disc transport mechanism with respect to said housing for producing detection signals to control the operation of said drive means.

* * * * *